(12) United States Patent
Garcia et al.

(10) Patent No.: US 11,464,013 B2
(45) Date of Patent: Oct. 4, 2022

(54) COORDINATED LINK ADAPTATION AND PACKET SCHEDULING IN DYNAMIC SPECTRUM SHARING

(71) Applicant: Nokia Solutions and Networks Oy, Espoo (FI)

(72) Inventors: Ian Dexter Garcia, Naperville, IL (US); Hua Xu, Hawthorn Woods, IL (US); Jamil Shihab, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 165 days.

(21) Appl. No.: 17/074,729

(22) Filed: Oct. 20, 2020

(65) Prior Publication Data

US 2021/0127382 A1    Apr. 29, 2021

(30) Foreign Application Priority Data

Oct. 23, 2019  (FI) ..................................... 20195908

(51) Int. Cl.
*H04L 12/26* (2006.01)
*H04W 72/04* (2009.01)
(Continued)

(52) U.S. Cl.
CPC ......... *H04W 72/046* (2013.01); *H04L 5/0048* (2013.01); *H04W 24/08* (2013.01);
(Continued)

(58) Field of Classification Search
CPC ............... H04W 72/046; H04W 24/08; H04W 72/0453; H04W 72/082; H04W 72/1231;
(Continued)

(56) References Cited

U.S. PATENT DOCUMENTS 9,467,865 B2   10/2016  Joshi et al.
2015/0334575 A1  11/2015  Joshi et al.
(Continued)

FOREIGN PATENT DOCUMENTS

CN    109588059 A    4/2019
CN    109842476 A    6/2019
(Continued)

*Primary Examiner* — Thai D Hoang
(74) *Attorney, Agent, or Firm* — Harrington & Smith

(57) ABSTRACT

An apparatus including circuitry configured to define a spatial beam codebook of size NB on the basis of radiation patterns of an antenna array of a base station of a radio access network, which utilizes inter-radio-access technology, wherein each beam corresponds to a radiation pattern whose main lobe is uniquely directed to an angular direction with respect to the antenna array. The apparatus further includes circuitry configured to assign a spatial beam index from the spatial beam codebook for a candidate user equipment of the radio access technology; circuitry configured to assign a set of subcarriers for candidate user equipment of the radio access technology for each spatial beam index; and circuitry configured to use the assigned sets of subcarriers and spatial beam indices of the other radio-access-technology for one or more of resource pool partitioning, link-adaptation, and packet scheduling for the candidate user equipment.

19 Claims, 9 Drawing Sheets

(51) Int. Cl.
*H04L 5/00* (2006.01)
*H04W 24/08* (2009.01)
*H04W 72/08* (2009.01)
*H04W 72/12* (2009.01)

(52) U.S. Cl.
CPC ..... *H04W 72/0453* (2013.01); *H04W 72/082* (2013.01); *H04W 72/1231* (2013.01)

(58) Field of Classification Search
CPC ... H04L 5/0048; H04B 7/0456; H04B 7/0695; H04B 7/12; H04B 7/0617
USPC ............ 370/252, 329–330, 335–34; 375/260
See application file for complete search history.

(56) References Cited

U.S. PATENT DOCUMENTS

| | | | |
|---|---|---|---|
| 2018/0145737 A1* | 5/2018 | Rahman | H04B 7/0478 |
| 2018/0287841 A1* | 10/2018 | Subramanian | H04L 5/0053 |
| 2019/0222275 A1 | 7/2019 | Mo et al. | |
| 2020/0403723 A1* | 12/2020 | Hoydis | H04L 5/0044 |
| 2021/0036817 A1* | 2/2021 | Bai | H04L 5/0025 |
| 2021/0167875 A1* | 6/2021 | Shen | H04W 16/28 |
| 2021/0399783 A1* | 12/2021 | Onggosanusi | H04W 52/367 |

FOREIGN PATENT DOCUMENTS

| | | | | |
|---|---|---|---|---|
| CN | 110226293 A | 9/2019 | | |
| EP | 3940968 A1 * | 1/2022 | ............. | H04B 7/024 |
| WO | WO-2017196246 A2 | 11/2017 | | |
| WO | WO-2021025837 A1 * | 2/2021 | ........... | H04B 7/0404 |

\* cited by examiner

COORDINATED LINK ADAPTATION AND PACKET SCHEDULING IN DYNAMIC SPECTRUM SHARING

TECHNICAL FIELD

The present invention relates to a method and apparatus for link-adaptation and packet scheduling.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

5G-NR ($5^{th}$ generation New Radio) is a new radio access technology which has been developed by the $3^{rd}$ generation partnership project (3GPP) for the $5^{th}$ generation mobile networks. 5G-NR has been specified within 3GPP to be able to coexist with 4G-LTE (Long Term Evolution) within the same spectrum. The ability to co-exist in the same spectrum (i.e. spectrum sharing) is desirable to radio access network (RAN) operators to save on valuable spectrum resources while supporting multiple radio access technologies (RATs) under the same cellular footprint.

Some dynamic spectrum sharing (DSS) solutions that assume orthogonality of inter-rat transmissions use one of the following multiplexing methods to minimize interference among coexisting radio access technologies within the same coverage footprint:

Time Domain Multiplexing (TDM-DSS):
Frequency Domain Multiplexing (FDM-DSS);
TDM-FDM DSS.

In TDM-DSS RATs use separate non-overlapping time slots. Listen-before-talk and frame partitioning schemes are forms of time domain multiplexing. Some advantages are simplicity and highest instantaneous peak throughputs, but a problem is higher latency since RATs must wait for their time slot for transmission. Furthermore, average throughputs may be reduced due to reduced time resources for each RAT.

In FDM-DSS RATs use separate non-overlapping frequency resource blocks, which has the advantage that latency is low, but reduced peak throughput may be caused since there is a reduced amount of frequency resources for transmission. In addition, if the coexisting RATs do not use the same OFDM (Orthogonal Frequency Division Multiplexing) modulation raster, guard resource blocks are typically placed between the coexisting RATs making those resource blocks unusable for transmission, thereby reducing the global spectral efficiency.

In TDM-FDM DSS RATs use non-overlapping time-frequency-code resource blocks achieving flexibility through time-frequency resource pools but causing lower cell spectral efficiency since spatially separated users of different RATs cannot be simultaneously served on the same time-frequency resource.

One problem or limitation of the methods above is reduced spectral efficiency compared to schemes which permit simultaneous transmissions at the cost of some amount of cross-interference, as described in the following.

Some DSS solutions that assume non-orthogonality of inter-rat transmissions use one of the following multiplexing methods to minimize interference among coexisting RATs within the same coverage footprint:

Non-orthogonal Multiplexing (NOM-DSS);
Transmit Power Control (TPC-DSS).
Space Division Multiplexing (SDM-DSS)

In SDM-DSS RATs use overlapping time-frequency-code-beam resources. Interference mitigation is accomplished through non-linear successive interference calculation at the receivers. NOM-DSS may provide some throughput gain over (quasi)-orthogonal multiplexing schemes but for the down link (DL), user equipments (UEs) of coexisting RATs must be able to decode the transmissions for UEs of other RATs. This may significantly increase receiver complexity over (quasi) orthogonal multiplexing schemes due to the requirement for multi-RAT decoding capability and due to the iterative and non-linear method of decoding. The high complexity may render it infeasible to many applications.

In TPC-DSS RATs assume partial overlap of coverage and use transmit power control to limit the amount of inter-RAT interference, which has the advantage of simplicity but may have reduced coverage and throughput due to reduced transmission power.

In SDM-DSS RATs use overlapping time-frequency-code resources. The interference mitigation is accomplished through spatial multiplexing wherein the spatial characteristics of the MIMO (Multiple Input Multiple Output) channel is used to form full or partial nulls to UEs of other coexisting RATs. As an advantage, peak throughput and minimum latency could be achieved and throughput gains over TDM/FDM/TDM-FDM schemes are achievable but similar problems of other types of SDM-DSS may exist:

In SDM-DSS without traffic-dependence the existing RF-sharing and (slow/fast) coordination schemes cannot take advantage of the gains that could be achieved by exploiting the random arrivals of data across RATs at the subframe/slot level that ultra-fast coordination could exploit, resulting in reduced achievable spectral efficiencies.

In SDM-DSS with Joint-scheduling approach, joint scheduling uses a single scheduler shared by the coexisting RATs and can achieve optimal global throughput. However, it may require sharing of all scheduler-related quantities across RATs and increased computational complexity which may be prohibitive in real-world deployments.

The patent application US 2019/222275 discloses a method of a user equipment (UE) in a wireless communication system, which method comprises identifying E-field data of each antenna of the UE to be used for transmitting and receiving data, generating, based on the E-field data, a set of codewords including a first and second upper bounds, the set of codewords corresponding to candidate beams of each antenna, selecting at least one codeword from the set of codewords based on a performance criteria, configuring a codebook to be used for each antenna by adding the at least one codeword into the codebook, determining whether the codebook including the at least one codeword satisfies a condition to stop adding another codeword to the codebook, and applying the configured codebook for use in transmitting or receiving the data at each antenna based on whether the condition is satisfied. In other words, the purpose of the method of US 2019/222275 is an efficient beam codebook generation for 5G terminal.

SUMMARY

Some embodiments provide a method and apparatus for link-adaptation and packet scheduling that utilizes the presence and characteristics of instantaneous inter-RAT traffic to improve the user throughput performance under inter-radio-access-technology (inter-RAT) dynamic spectrum sharing.

In accordance with an embodiment, there is provided a method for LTE-NR ultra-fast coordination for spectrum sharing, which may be applicable to any pair or group of RATs which have separate packet schedulers but coexist and share the same radio frequency (RF) range.

In accordance with an embodiment, there is provided a method and apparatus for link-adaptation and scheduling, which utilizes the presence and characteristics of instantaneous inter-RAT traffic to improve the user throughput performance under inter-radio-access-technology dynamic spectrum sharing. It performs the joint partitioning of shared frequency and spatial-beam resources to the RATs and modifies the link adaptation and packet scheduling metrics based on the resource partition and the traffic. An embodiment is diagrammed in FIG. 5.

Some aspects for several embodiments are coexistence of RF-shared multi-RAT, wherein base stations (BSs) of multiple RATs in overlapping spectra are served using shared radio frequency circuitry, active antennas (e.g. massive MIMO), and demodulation reference signal (DMRS) based transmission. All three technologies may be applicable to the LTE and NR coexistence scenario.

RF-shared multi-RAT coexistence may ensure that the coexisting RATs have the same channel to the users. By having the same channel, orthogonalization of the transmissions solely via the spatial domain without the need for inter-RAT channel estimation reference signals is possible. Massive MIMO enables highly directional spatial beams for MU-MIMO transmissions via codebook-based transmissions. DMRS-based transmission of both RATs enables orthogonalization of both data and reference symbols with respect to other RAT's transmissions. Because of these three technologies, spatial division multiplexing between LTE and NR is possible, and is used as a framework for different embodiments.

It should be noted here that in this specification, the term 'base station' refers to a logical element containing logical communication system layers (e.g. L1, L2, L3). The base stations of different RATs may be implemented in the same hardware or at separate hardware. It should also be mentioned that although the expressions "each base station" and "each mobile station" or "each user equipment" may be used, these terms need not mean every existing base station, mobile station or user equipment but base stations, mobile stations or user equipment in a certain area or set. For example, each base station may mean all base stations within a certain geographical area or all base stations of an operator of a wireless communication network or a sub-set of base stations of an operator of a wireless communication network.

In accordance with an embodiment, a multi-RAT resource manager is provided that determines each BS's beam-frequency resource pool or provides a policy to each RAT's schedulers determine its resource pool. A beam-frequency resource pool is a set of beam-frequency pair resources that the BS can use for its frequency resource allocation and beamforming. Each BS's scheduler limits its transmissions to within its resource pool. A policy is the procedure used by each BS to determine its own resource pool from its own traffic metrics and shared traffic metrics from BSs of other RATs. The shared traffic metrics may include 1) for each scheduling candidate user: resource load, single-user priority metric per resource, multi-user-MIMO status, and beam index; and 2) requested reserved resource load.

In accordance with an embodiment, a resource pool partition optimality problem definition is provided that defines the optimality of a beam-frequency resource pool partition based on traffic metrics and frequency and beam allocations of BSs of multiple RATs. Maximizing the utility function of the problem leads to maximized weighted sum of the logarithm of throughputs across users of all coexisting RATs. The optimality function incorporates the resource load, single-user priority metric per resource, multi-user-MIMO status, and beam index.

In accordance with an embodiment, methods of beam-frequency resource pool determination or policy are provided which use shared dynamic scheduler quantities as input and uses a spatial beam codebook and a discriminative classifier. The inputs, outputs, and procedures are defined for the following policy frameworks: 1) beam angle separation, 2) multiple regression or support vector clustering, 3) combinatorial search, 4) and neural network. The neural network classifier may be trained on samples which optimize the defined user-throughput-based utility function or perform an arbitrary threshold function. The beam-frequency resource pools are determined dynamically (e.g. less than 10 ms interval) and are determined either periodically or by an event trigger.

In accordance with an embodiment, a multi-RAT resource manager is provided which either directly calculates and shares the inter-RAT interference predictions to each base station (BS) or determines an inter-RAT interference prediction policy. If a policy is used, each base station calculates the inter-RAT interference based on the instantaneous shared traffic and scheduler quantities by base stations of other RATs. The policy is the procedure used by each scheduler for determining its resource pool and inter-RAT interference prediction. The interference predictions are determined dynamically (e.g. less than 10 ms interval) and are either determined periodically or by an event trigger.

In accordance with an embodiment, a method of modifying the link-adaptation and scheduler prioritization from the inter-RAT interference predictions is provided. For this method, the predicted received signal-to-noise ratio (SINR) at each beam-frequency resource is adjusted by the predicted inter-RAT interference. The adjusted predicted receive SINR is then used for link-adaptation and scheduler prioritization.

By jointly exploiting both frequency domain and the spatial domain variability in traffic, throughput and latency gains over FDM, TDM, and SDM may be achieved and may be applicable to NR-LTE in coexistence.

According to some aspects, there is provided the subject matter of the independent claims. Some further aspects are defined in the dependent claims. The embodiments that do not fall under the scope of the claims are to be interpreted as examples useful for understanding the disclosure.

According to a first aspect there is provided a method comprising:

defining a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

assigning a spatial beam index from the spatial beam codebook for a candidate user equipment of the radio access technology;

assigning a set of subcarriers for the candidate user equipment of the radio access technology for each spatial beam index; and using the assigned set of subcarriers and spatial beam indices of the other radio-access technology for one or more of resource pool partitioning, link-adaptation, and packet scheduling for the candidate user equipment.

According to a second aspect there is provided an apparatus comprising:

means for defining a spatial beam codebook of size NB on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

means for assigning a spatial beam index from the spatial beam codebook for a candidate user equipment of the radio access technology;

means for assigning a set of subcarriers for candidate user equipment of the radio access technology for each spatial beam index; and means for using the assigned sets of subcarriers and spatial beam indices of the other radio-access-technology for one or more of resource pool partitioning, link-adaptation, and packet scheduling for the candidate user equipment.

According to a third aspect there is provided an apparatus comprising at least one processor; and at least one memory including computer program code the at least one memory and the computer program code configured to, with the at least one processor, cause the apparatus to perform at least the following:

define a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

assign a spatial beam index from the spatial beam codebook for a candidate user equipment of the radio access technology;

assign a set of subcarriers for candidate user equipment of the radio access technology for each spatial beam index; and use the assigned sets of subcarriers and spatial beam indices of the other radio-access-technology for one or more of resource pool partitioning, link-adaptation, and packet scheduling for the candidate user equipment.

According to a fourth aspect there is provided a method comprising:

obtaining information about at least one spatial beam assigned by a base station for a user equipment from a spatial beam codebook of size NB on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

calculating traffic metrics regarding communication between the base station and the user equipment;

sending the calculated traffic metrics to a resource manager;

receiving from the resource manager a resource pool and an inter-RAT interference map;

using the resource pool and the inter-RAT interference map for adjusting link-adaptation and packet scheduling for the user equipment.

According to a fifth aspect there is provided a computer program comprising computer readable program code means adapted to perform at least the following:

defining a spatial beam codebook of size NB on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

assigning a spatial beam index from the spatial beam codebook for a candidate user equipment of the radio access technology;

assigning a set of subcarriers for the candidate user equipment of the radio access technology for each spatial beam index; and using the assigned set of subcarriers and spatial beam indices of the other radio-access technology for one or more of resource pool partitioning, link-adaptation, and packet scheduling for the candidate user equipment.

According to a sixth aspect, there is provided a computer program according to an aspect embodied on a computer readable medium.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 9:
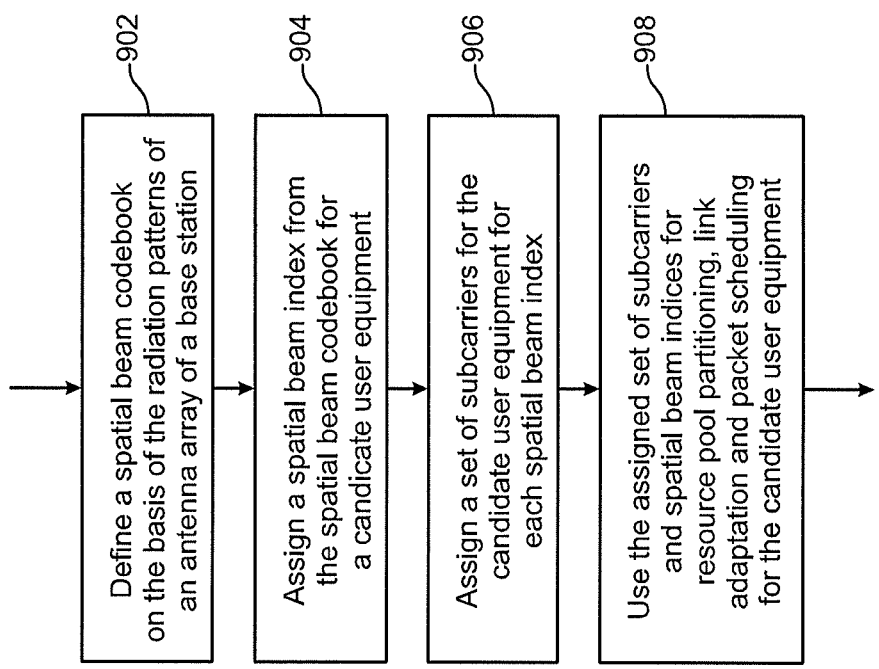
FIG. 9 illustrates example of methods in accordance with at least some embodiments of the present invention.

A spatial beam codebook may be defined as follows, in accordance with an embodiment. This is illustrated with the block 902 in FIG. 9.

A spatial beam codebook of size $N_B$ and whose elements are indexed by b is defined, wherein b=1,2, . . . , $N_B$. Each spatial beam (worded as beam henceforth) corresponds to a radiation pattern whose main lobe is uniquely directed to an angular direction with respect to the antenna array broadside in both the azimuth (i.e. horizontal) and zenith (i.e. vertical) planes. The angular direction for the bth beam may be denoted as ($h_b$, $v_b$) where $h_b$ and $v_b$ are horizontal angles and vertical angles of the bth beam, respectively.

Each candidate user (indexed as u) of each RAT is assigned (904) a spatial beam index ($b_u$) from the spatial beam codebook which may be determined by feedback from the UE or by vector quantization of measurements of the user equipment's reference signals. The method of vector quantization may be based on minimizing cross-correlations, or minimizing angular distances, or other methods, and is left to implementation discretion.

A set of subcarriers may be assigned (906) for the candidate user equipment of the radio access technology for each assigned spatial beam index.

The assigned set of subcarriers and the spatial beam index is used (908) for the resource pool partitioning, link-adaptation, and packet scheduling in the context of some embodiments. The beamforming applied to the user equipment at a physical (PHY) layer may use the codebook beam weights or the original (i.e. non-codebook) beam weights.

A beam-frequency resource pool (also worded as resource pool henceforth) may be defined as follows, in accordance with an embodiment.

A beam-frequency resource is a resource for data transmission consisting of a set of subcarriers (i.e. a resource block) that are sent over multiple antennas and whose per-antenna weight is determined by the beam index. Each beam-frequency resource is addressed either by the pair (b,f) or the triplet ($h_b$, $v_b$, f) where f=1,2, . . . , $N_F^{Global}$ where $N_F^{Global}$ is the global total number of frequency resources. The global resource pool can be denoted as $A^{Global}=$ {(b,f)|∀b,∀f}.

The beam-frequency resource pool is the set of paired resources for use by a RAT. Within the context of some embodiments, it is assumed that the resource pool of a RAT is exclusive to that of other RATs. In general, the resource pools are non-orthogonal (i.e. may be interfering) to each other.

An assignment indicator value unique to the rth RAT can be denoted as $\hat{z}_r \in \mathbb{R}$. Furthermore, let $z_{b,f} \in \{\hat{z}_0, \hat{z}_1, \hat{z}_2, \ldots, \hat{z}_{N_R}\}$ specify the resource pool assignment for resource $r_{b,f}$ wherein $\hat{z}_0$ denotes the indicator for non-assignment to any RAT. The resource pool for the rth RAT can be denoted as the set $A_r^{total}=\{r_{b,f}|z_{b,f}=\hat{z}_r\}$. For convenience, an indicator ($\zeta_{r,b,f}$) is defined which creates a bit map for RAT resource assignment:

$$\zeta_{r,b,f} = \begin{cases} 1 & \text{for } z_{b,f} = \hat{z}_r \\ 0 & \text{otherwise} \end{cases} \quad (1)$$

Since the resource pools are non-overlapping, $A^{Global}=U_{r=0}^{N_R} A_r^{total}$.

In the following, interference calculation is described in accordance with an embodiment.

The inter-RAT interference may be formulated as a received power ratio wherein the expected or measured received power of the inter-RAT transmission is in the numerator and the denominator is the expected or measured received power of the desired signal. The value is a function of the spatial beam index (or the beam weight) and frequency index (i.e. resource block index) of the inter-RAT transmission and the spatial beam index (or the beam weight) and frequency index of the desired signal.

The interference at a resource ($I^{resource}$) may be defined as:

$$I^{resource} = I^{beam} I^{frequency} \quad (2)$$

where $I^{beam}$ denotes the interference-to-signal ratio due to differing beams and $I^{frequency}$ denotes the interference-to-signal ratio due to differing frequency. $I^{beam}$ of the kth beam on the bth beam is expressed as the received power ratio $$I^{beam}_{q,k,b,g} = \frac{P_k|Hw_k|^2}{P_b|Hw_b|^2} \cong \frac{P_k w_k' w_b}{P_b w_b' w_b} \quad (3)$$

where $w_k$ and $w_b$ denote the beam weights of the kth beam and the bth beam respectively, H is the effective channel to the user, and $P_k$ and $P_b$ denote the allocated power of the kth beam and the bth beam respectively.

$I^{frequency}$ is a function of the frequency gaps between the interfering subcarriers to the signal carriers. For example, when OFDM is used, $I_{frequency}$ of the resource at the gth frequency of the qth RAT on the fth frequency of the rth RAT can be expressed as $$I^{frequency}_{g,f,q,r} = \frac{T_{S,q} \sum_{j=1}^{N_{S,q}} \sum_{i=1}^{N_{S,r}} \text{sinc}^2(\pi(\phi_{q,g,j} - \phi_{r,f,i})T_{S,q})}{T_{S,r} N_{S,q} N_{S,r}} \quad (4)$$

where $N_S$ is the number of subcarriers, $T_S$ is the duration of the OFDM symbol, and $\phi$ is the frequency of the subcarrier of the RAT. When RATS use the same orthogonal frequency division multiplexing (OFDM) raster, $I_{frequency}=0$.

The total interference of inter-RAT transmissions (β) for the (b,f) resource of the rth RAT can be defined as $$\beta_{r,b,f} = \sum_{\substack{q=1 \\ q \neq r}}^{N_R} \sum_{k=1}^{N_B} \sum_{g=1}^{N_F^{Global}} x_{q,k,g} \zeta_{r,b,f} I^{beam}_{q,k,b,f} I^{frequency}_{g,f,q,r} \quad (5)$$

where the scheduling selection indicator $x_{q,k,g} \in \{0,1\}$ indicates whether the (k,g) resource of the qth RAT is selected by the scheduler for transmission.

Meanwhile, assuming OFDM transmissions, the total interference of intra-RAT cross-beam transmissions (γ) depends only on the beams of co-scheduled users used on the frequency:

$$\gamma_{r,b,f} = \sum_{\substack{k=1 \\ k \neq b}}^{N_B} x_{r,k,f} \zeta_{r,k,f} I^{beam}_{k,b} \quad (6)$$

Priority Metric Definition

In the following, a definition of a priority metric will be provided, in accordance with an embodiment.

The priority metric per resource $p_{u,r,f}$ is the measure of scheduling prioritization for the user given a single resource.

An example is for a proportionally fair (PF) scheduling, where $$p_{u,r,f} = p_{u,r,f}^{PF} = q_{u,r} \frac{T_{u,r}^{instantPerResource}(s_{r,b_u,f}^{MU})}{T_{u,r}^{aveAllResource}},$$

where $T_{u,r}^{instantPerResource}$ is the instantaneous throughput of the uth user of the rth RAT for a single resource and is a function of the multi-user signal-to-noise-ratio ($s_{r,b,f}^{MU}$). $T_{u,r}^{aveAllResource}$ is the average throughput of the uth user for all resources. The QoS-class weight $q_{u,r}$ provides further prioritization for users with more stringent quality-of-service requirements or different target throughputs and its value is left to implementation discretion. The QoS-class weight can also incorporate RAT-dependent prioritization.

The multi-user signal-to-noise-ratio term depends on the sum of the intra-RAT interference and inter-RAT interference $\alpha_{r,b_u,f} = \gamma_{r,b_u,f} + \beta_{r,b_u,f}$, and is formulated as:

$$s_{r,b_u,f}^{MU} = \frac{1}{\alpha_{r,b_u,f} + 1/s_{r,b_u,f}^{SU}} \quad (7)$$

where $r_{r,b_u,f}^{SU}$ denotes the single-user signal-to-noise-ratio term.

Since the SINR depends on the beam-frequency selections and scheduling selections of all RATs, the priority metric is also a function of the beam-frequency selections and scheduling selections of all RATs: $p_{u,r,f}(\{\zeta_{r,b_u,f}\}, \{x_{r,b_u,f}\})$.

In the following, some examples of operation modes will be provided, in accordance with an embodiment.

A first example of the operation modes is a centralized operation mode and a second example of the operation modes is a distributed operation mode.

Under the centralized operation mode, resource pools and inter-RAT interference maps are calculated by the resource manager directly from the traffic metrics. The resource manager communicates to each base station its resource pool and inter-RAT interference map. The base stations perform link-adaptation and packet scheduling based on its assigned resource pool and inter-RAT interference map.

Figure 6:
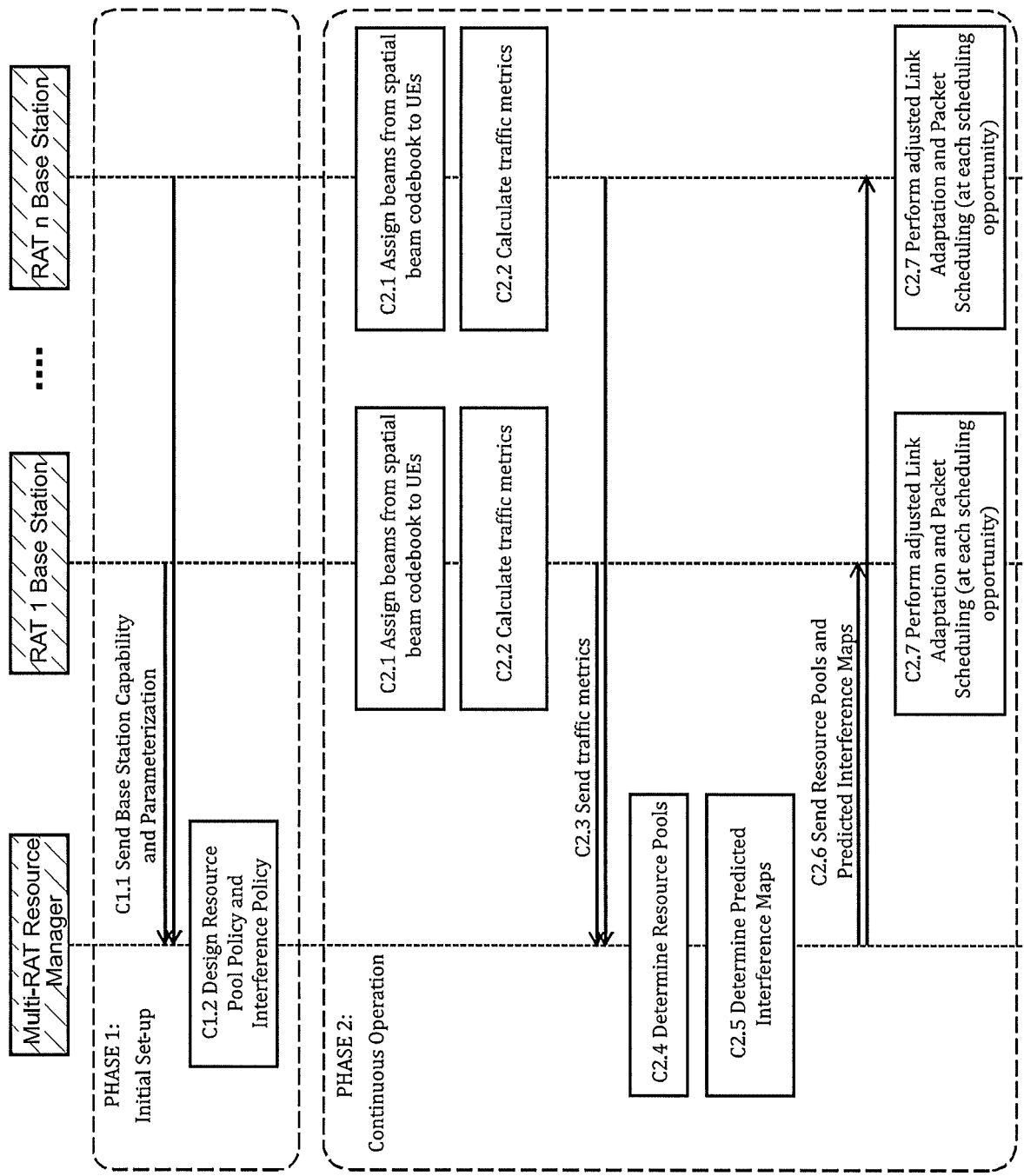
FIG. 6 shows inter-RAT-traffic-aware link adaptation and packet scheduling using a centralized operation, in accordance with an embodiment.

The centralized operation procedure is diagrammed in FIG. 6 according to an embodiment and comprises at least the following phases:

An initial set-up is performed in Phase 1. In the initial set-up each base station sends a base station capability and parameterization information to the resource manager. This is depicted with the arrow C1.1 in FIG. 6. The base station capability and parameterization information can comprise, for example, the type of inter-RAT-traffic-aware operation, the supported method(s) of resource pool determination, the supported method(s) of inter-RAT interference prediction, and beam codebook definitions. On the basis of the received information regarding supported methods of resource pool partitioning by base stations the resource manager designs a resource pool policy and an interference policy (the block C1.2 in FIG. 6).

An example of continuous operation begins at Phase 2. Phase 2 may be performed periodically, for example at every scheduling opportunity or larger interval, or may be triggered by an event.

Base stations assign beams from spatial beam codebook to user equipments (UEs), blocks C2.1 in FIG. 6. Beams may be assigned periodically, for example at every scheduling opportunity or larger interval or may be event-triggered. This may be performed by each base station or may be fed-back from UE to base station. Then, base stations may calculate traffic metrics (block C2.2 in FIG. 6). The traffic metrics may be recalculated periodically, for example at every scheduling opportunity or larger interval or may be event-triggered. The calculated traffic metrics may comprise for each scheduling candidate user: resource load, single-user priority metric per resource, multi-user-MIMO status indicator and a beam index. The calculated traffic metrics may also comprise requested reserved resource load.

When the traffic metrics have been calculated, the calculated traffic metrics may be sent (arrow C2.3 in FIG. 6) by each base station to a resource manager. Also the transmission of the calculated traffic metrics may be performed periodically, for example at every scheduling opportunity or larger interval or may be event-triggered.

The resource manager receives the transmitted calculated traffic metrics and may use the information of the received traffic metrics to determine resource pools (block C2.4 in FIG. 6). In the determination the resource manager may use per-beam metrics from base stations as input and use a resource pool policy as the procedure. The determination may be performed periodically, for example at every scheduling opportunity or larger interval or be event-triggered.

The resource manager may also determine predicted interference maps (block C2.5 in FIG. 6). This determination may be based on the resource pool, wherein also the determination of the predicted interference maps may be performed periodically, for example at every scheduling opportunity or larger interval or be event-triggered.

The resource manager may send resource pools and predicted interference maps to base stations (arrow C2.6 in FIG. 6). The resource manager may send the resource pools and predicted interference maps periodically, for example at every scheduling opportunity or larger interval or be event-triggered.

Base stations receive information on the resource pools and predicted interference maps from the resource manager and perform adjusted link adaptation and packet scheduling (block C2.7 in FIG. 6). The adjusted link adaptation and packet scheduling may be performed by each base station at each scheduling opportunity, for example at a transmission-time-interval.

Figure 7:
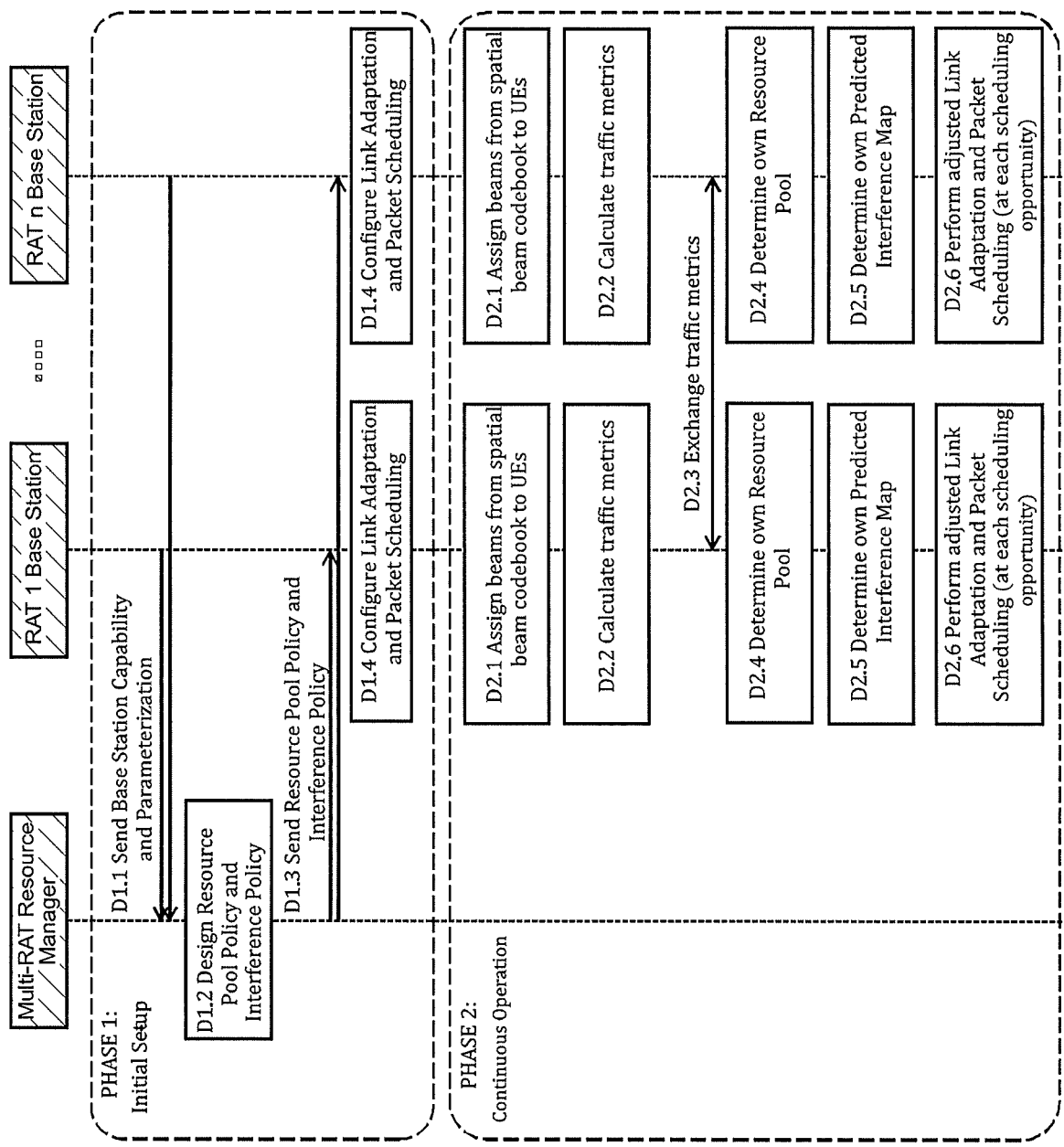
FIG. 7 shows inter-RAT-traffic-aware link adaptation and packet scheduling using a distributed operation, in accordance with an embodiment.

The distributed operation procedure is diagrammed in FIG. 7 according to an embodiment. Under distributed operation, the resource pool determination and inter-RAT interference determination policy are communicated by the resource manager during initial set-up. During continuous operation, based on shared traffic metrics and the policy, each base station will choose the appropriate resource pool table and inter-RAT interference map. It will then perform its link adaptation and packet scheduling in accordance to the resource pool table and inter-RAT interference map.

An initial set-up is performed in Phase 1. In the initial set-up each base station sends a base station capability and parameterization information to the resource manager. This is depicted with the arrow D1.1 in FIG. 7. The base station capability and parameterization information can comprise, for example, the type of inter-RAT-traffic-aware operation, the supported method(s) of resource pool determination, the supported method(s) of inter-RAT interference prediction, and beam codebook definitions. On the basis of the received information regarding supported methods of resource pool partitioning by base stations the resource manager designs a resource pool policy and an interference policy (the block D1.2 in FIG. 7). The resource manager sends designed resource pool policy and an interference policy to the base stations (the block D1.3 in FIG. 7). The base stations receive the designed resource pool policy and an interference policy and configure link adaptation and packet scheduling (the block D1.4 in FIG. 7).

After the initial set-up phase a continuous operation (Phase 2) may begin. Base stations assign beams from spatial beam codebook to UEs (block D2.1 in FIG. 7) similarly to C2.1 in the centralized operation mode described above. The base stations also calculate traffic metrics (block D2.2 in FIG. 7) similarly to C2.2 in the centralized operation mode and exchange calculated traffic metrics (arrow D2.3 in FIG. 7). In accordance with an embodiment, this is performed so that each base station sends calculated traffic metrics to each other base station in the system. The calculated traffic metrics may be sent periodically, for example at every scheduling opportunity or larger interval or may be event-triggered.

In block D2.4 base stations may determine their own resource pool, in which own traffic metrics of the base station and traffic metrics of other base stations of other RATs are used as input. A resource pool policy is used as the procedure in the determination. The determination may be performed periodically, for example at every scheduling opportunity or larger interval or may be event-triggered.

In block D2.5 the base stations may determine their own predicted interference map based on their own resource pool and resource pools of the other base stations. The determination may be performed periodically, for example at every scheduling opportunity or larger interval or may be event-triggered.

In block D2.6 the base stations may perform adjusted link adaptation and packet scheduling similarly to the adjusted link adaptation and packet scheduling of the centralized operation mode described in connection with block C2.7 above.

In the following, some traffic metric definitions will be explained in more detail, in accordance with an embodiment. For each scheduling candidate user shared traffic metrics may comprise resource load ($l_{u,r}$), single-user priority metric per resource ($p_{u,r}^{SU}$), multi-user MIMO (MU-MIMO) status indicator ($m_{u,r}$), beam index ($b_{u,r}$).

The resource load ($l_{u,r}$) indicates the number of resources needed to drain the buffer assuming SU-MIMO transmission and no inter-RAT interference. The load is upper-bounded by the total number of frequency resources: $1 \le l_{u,r} \le N_F^{Global}$.

The single-user priority metric per resource ($p_{u,r}^{SU}$) is the priority metric per resource under SU-MIMO transmission: $p_{u,r}^{SU} = p_{u,r}(\alpha = 0)$.

The multi-user MIMO (MU-MIMO) status indicator ($m_{u,r}$) takes on binary values: $m_{u,r} \in$ (false, true). A value of true indicates that the data of the uth user is capable of MU-MIMO transmission; otherwise the value is false. The indicator depends on the MIMO transmission mode and whether multi-user MIMO pairing related thresholds being exceeded by the user. If a user's status is false, then the user cannot be co-scheduled with users from the same RAT or other RATs on the same resource. In some approaches, only DMRS-based transmission modes can be used for inter-RAT MU-MIMO since both the DMRS and the data subcarriers are beamformed, and thus can be orthogonalized from simultaneous transmissions of other RATs The beam index ($b_{u,r}$) is an index of the assigned beam from the virtual beam codebook for the uth user.

The traffic metric definitions may also comprise a requested reserved resource load ($N_{F,r}^{Reserved}$) This is the number of requested frequency-domain resources for the RAT's exclusive use. These resources may be used for system information blocks, paging information, synchronization signal blocks, high-priority transmissions, etc. The resource pool policy blacklists these resources from other RATs.

Resource Pool Partition Optimality Problem Definition

The following optimality problem for inter-RAT beam-frequency resource pool partitioning can be defined as:

$$\underset{\{\zeta_{r,b,f}\}}{\text{maximize}} \Phi(\{\zeta_{r,b,f}\}) : \Phi = \underset{\{x_{r,b_u,f}\}}{\max} \sum_{r=1}^{N_R} \sum_{f=1}^{N_F^{Global}} \sum_{u=1}^{N_{U,r}} \zeta_{r,b_u,f} x_{r,b_u,f} p_{u,r,f}(\{\zeta_{r,b_u,f}\},\{x_{r,b_u,f}\}) \quad (8)$$

$$\text{such that } \sum_{f=1}^{N_F^{Global}} \zeta_{r,b_u,f} x_{r,b_u,f} p_{u,r,f}(\{\zeta_{r,b_u,f}\},\{x_{r,b_u,f}\}) \le \sum_{f=1}^{N_F^{Global}} p_{u,r,f} l_{u,r}$$

$$\sum_{\substack{k=1 \\ k \ne b}}^{N_B} x_{r,k,f} = 0 \text{ if } (m_{u,r} = \text{true}) \text{ and } (x_{r,b_u,f} = 1)$$

$$\zeta_{r,b_u,f} \in \{0,1\}; x_{r,b_u,f} \in \{0,1\}$$

$$\sum_{q=0}^{N_R} \zeta_{r,b,f} = 1$$

$$x_{r,b,f} = 0 \text{ if } \zeta_{r,b,f} = 0$$

where $p_{u,r,f}(\{\zeta_{r,b_u,f}\},\{_{r,b_u,f}\})$ indicates the dependence of the user priority metric on the set of partitioning indicators ($\{\zeta_{r,b_u,f}\}$) scheduling selections ($\{x_{r,b_u,f}\}$) and was detailed in the PRIORITY METRIC DEFINITION section. This problem is a binary integer programming problem and is NP-hard.

The inner max( ) term is the scheduler-selection-dependent multi-user multi-RAT sum priority metric. The first condition equation conserves the total priority metric of a user, while the second condition equation provides the condition for SU-MIMO users. The third and fourth conditions provide the binary programming constraints, while the final condition constrains the scheduling selections based on the resource pool partitioning.

Sub-Band Definition

A sub-band $A^{subband}$ can be defined as the set of resources within a contiguous group of frequencies: $A^{subband} = \{(b,f) | \forall b; f_{subband}^{first} \le f \le f_{subband}^{last}\}$ where $f_{subband}^{first}$ and $f_{subband}^{last}$ are the lowest and highest frequencies of the sub-band respectively.

Resource Pool Policies

The resource pool policy is the procedure used by the resource manager to determine the resource pools or the procedure used by each BS to determine its own resource pool. All policies which will be defined share three common steps, followed by a policy-specific step which partitions resources for MU-MIMO-capable transmissions. The general policy is as follows.

General Resource Pool Partitioning Policy

In a first common step, reserved resources are apportioned from the global resource pool. The total reserved resource load ($N_{F,All}^{Reserve}$) can be defined as $N_{F,All}^{Reserve} = \sum_{r=1}^{N_R} N_{F,r}^{Reserved}$. This amount of frequency domain resources are removed from the global resource pool to yield $N_{F,All}^{NonReserve}$ remaining frequency domain resources for partitioning, wherein $N_{F,All}^{NonReserve} = N_F^{Global} - N_{F,all}^{Reserve}$.

The per-RAT reserved sub-band can be defined as $A_r^{Reserve} = \{(b,f) | \forall b; \ f_r^{Reserve,first} \leq f \leq f_r^{Reserve,last}\}$ wherein $f_r^{Reserve,first}$ is the first reserved resource's frequency position and the last reserved resource is $f_r^{Reserve,last}$ wherein $f_r^{Reserve,last} = f_r^{Reserve,first} + N_{F,r}^{Reserve}$. The position of the first reserved resource within the frequency grid is left to implementation discretion.

In a second common step the non-reserved resource pool is partitioned to SU-MIMO and MU-MIMO sub-bands. The per-RAT SU-MIMO priority metric ($p_{All,r}^{SU}$) can be defined as:

$$p_{All,r}^{SU} = \sum_{\substack{u=1 \\ m_{u,r}=false}}^{N_{U,r}} u = 1 \, p_{u,r}^{SU} l_{u,r} \quad (9)$$

Similarly, the per-RAT MU-MIMO priority metric ($p_{All,r}^{MU}$) can be defined as:

$$p_{All,r}^{MU} = \sum_{\substack{u=1 \\ m_{u,r}=true}}^{N_{U,r}} p_{u,r}^{SU} l_{u,r} \quad (10)$$

From the per-RAT metrics, the global SU-MIMO priority metric can be defined as $p_{Global}^{SU} = \sum_r^{N_R} p_{All,r}^{SU}$ and the global MU-MIMO priority metric can be defined as $p_{Global}^{MU} = \sum_r^{N_R} p_{All,r}^{MU}$.

The global SU-MIMO and MU-MIMO priority metrics can be used to partition the non-reserved sub-bands proportionally between the SU-MIMO and MU-MIMO transmissions, wherein the SU-MIMO sub-band is reserved for SU-MIMO transmissions while the MU-MIMO sub-band is reserved for MU-MIMO transmissions. The SU-MIMO sub-band and MU-MIMO sub-band are mutually exclusive and collectively exhaustive. Though the SU-MIMO and MU-MIMO sub-bands are delineated during resource pool determination, a base station scheduler may override the reservations during packet scheduling. In other words, SU-MIMO transmissions may eventually be allocated by the scheduler within the MU-MIMO sub-band.

The SU-MIMO sub-band ($A_{All}^{SU}$) is composed of $N_F^{SU}$ frequency domain resources, wherein $$N_F^{SU} = \min\left( \text{round}\left( N_{F,All}^{NonReserve} \frac{p_{All,r}^{MU}}{p_{All,r}^{SU} + p_{All,r}^{MU}} \right), \sum_r^{N_R} \sum_{\substack{u=1 \\ m_{u,r}=false}}^{N_{U,r}} l_{u,r} \right) \quad (11)$$

while the MU-MIMO sub-band ($A_{All}^{MU}$) is composed of $N_F^{MU}$ frequency domain resources, wherein $N_F^{MU} = N_{F,All}^{Reserve} - N_F^{SU}$.

The order of the frequency-domain first positions of the SU-MIMO sub-band ($f_{All}^{SU,first}$) and the MU-MIMO sub-band ($f_{All}^{MU,first}$) within the frequency grid is arbitrary and is left to implementation discretion.

From the first positions, the SU-MIMO sub-band can be defined as $A_{All}^{SU} = \{(b,f) | \forall b; \ f_{All}^{SU,first} \leq f \leq f_{All}^{SU,last}\}$ where $f_{All}^{SU,last} = f_{All}^{SU,first} + N_F^{SU}$. Similarly, the MU-MIMO sub-band is $A_{All}^{MU} = \{(b,f) | \forall b; \ f_{All}^{MU,first} \leq f \leq f_{All}^{MU,last}\}$ where $f_{All}^{MU,last} = f_{All}^{MU,first} + N_F^{MU}$.

In the third common step the SU-MIMO sub-band is partitioned to the different RATs. Once the SU-MIMO sub-band ($A_{All}^{SU}$) is determined, it is then subdivided to per-RAT SU-MIMO sub-bands. The per-RAT SU-MIMO sub-band length for the rth RAT is $$N_{F,r}^{SU} = \min\left( \text{round}\left( N_F^{SU} \frac{p_{All,r}^{SU}}{p_{Global}^{SU}} \right), \sum_{\substack{u=1 \\ m_{u,r}=false}}^{N_{U,r}} l_{u,r} \right) \quad (12)$$

This priority-metric based partition potentially maximizes the sum of the logarithm of user throughputs under proportionally-fair scheduling.

The order of the frequency domain first positions ($f_r^{SU,first}$) of each per-RAT SU-MIMO sub-band within the SU-MIMO sub-band is left to implementation discretion. Finally, the resource pool within the MU-MIMO sub-band for the rth RAT is $A_r^{SU} = \{(b,f) | \forall b; \ f_r^{SU,first} \leq f \leq f_r^{SU,last}\}$ wherein $f_r^{SU,first} + N_{F,r}^{SU} = f_r^{SU,last}$.

In the next, fourth step, which is a policy-specific step, the MU-MIMO sub-band is partitioned to the different RATs. Once the MU-MIMO sub-band ($A_{All}^{MU}$) is determined, it is then subdivided to per-RAT MU-MIMO resource pools composed of beam-frequency resources.

In accordance with an embodiment, four partitioning policies can be defined for the MU-MIMO sub-band: a beam angle separation base partitioning policy; a multiple regression or support vector clustering based partitioning policy; a combinatorial search based partitioning scheme; and a neural-network-based resource pool partitioning.

Beam Angle Separation Based Partitioning

In the following, the first partitioning policy, namely, the beam angle separation base partitioning policy, will be described in more detail. In accordance with an embodiment, the procedure comprises at least the following:

A.0 The following arbitrary constants are defined: horizontal angle separation threshold $\mu_{Diff}^H$ ($\mu_{Diff}^H \geq 0$); vertical angle separation threshold $\mu_{Diff}^V$ ($\mu_{Diff}^V \geq 0$).

A.1 The weighted mean of the horizontal beam angles is calculated for all users of each RAT $$\mu_r^H = \frac{\sum_{\substack{u=1 \\ m_{u,r}=true}}^{N_{U,r}} h_{b_{u,r}} p_{u,r}^{SU} l_{u,r}}{\sum_{\substack{u=1 \\ m_{u,r}=true}}^{N_{U,r}} p_{u,r}^{SU} l_{u,r}} \quad (13)$$

A.2 Horizontal beam angle separation is checked: If $|\mu_r^H - \mu_{r-1}^H| \geq \mu_{Diff}^H$ for $r=2, \ldots, N^R$ proceed to perform partitioning of the horizontal angles in A.3. Otherwise, proceed to A.5 to calculate the weighted mean of the vertical beam angles.

A.3 Partitioning of the horizontal beam angles by RAT can be performed using a single-dimension multi-class discriminative classifier, wherein the specific technique is left to implementation discretion. The classifier provides a pair of horizontal angle thresholds for each RAT, $h_r^{min}$ and $h_r^{max}$, corresponding to the minimum and maximum horizontal angles of the beams within the resource pool of the RAT. Each sample is $h_{b_{u,r}}$, optionally weighted by $l_{u,r}$ or $p_{u,r}^{SU} l_{u,r}$.

A.4 The resource pool for the rth RAT within the MU-MIMO sub-band is $A_r^{MU} = \{(b,f) | h_r^{min} | h_r^{min} \leq h_b < h_r^{max}; f_{All}^{MU,first} \leq f \leq f_{All}^{MU,last}\}$ and the procedure can be ended.

A.5 The weighted mean of the vertical beam angles for all users of each RAT can be calculated as $$\mu_r^V = \frac{\sum_{\substack{u=1 \\ m_{u,r}=true}}^{N_{U,r}} v_{b_{u,r}} p_{u,r}^{SU} l_{u,r}}{\sum_{\substack{u=1 \\ m_{u,r}=true}}^{N_{U,r}} p_{u,r}^{SU} l_{u,r}} \quad (14)$$

A.6 Vertical beam angle separation may be checked as follows: If $|\mu_r^V - \mu_{r-1}^V| \geq \mu_{Diff}^V$ for $r=2, \ldots, N_R$ proceed to partitioning of the vertical beam angles at A.7. Otherwise, proceed to calculate the per-RAT MU-MIMO sub-band length for the rth RAT at A.9

A.7 Partitioning of the vertical beam angles by RAT may be performed using a single-dimension multi-class discriminative classifier, wherein the specific technique is left to implementation discretion. The classifier provides a pair of vertical angle thresholds for each RAT, $v_r^{min}$ and $v_r^{max}$, corresponding to the minimum and maximum vertical angles of the beams within the resource pool of the RAT. Each sample is $v_{b_{u,r}}$, optionally weighted by $l_{u,r}$ or $p_{u,r}^{SU} l_{u,r}$.

The resource pool for the rth RAT within the MU-MIMO sub-band is $A_r^{MU} = \{r_{b,f} | v_r^{min} \leq v_b < v_r^{max}; f_{All}^{first} \leq f < f_{All}^{last}\}$ and the procedure can be ended.

A.9 The per-RAT MU-MIMO sub-band length for the rth RAT can be calculated by:

$$N_{F,r}^{MU} = \text{round}\left(N_F^{MU} \frac{p_{All,r}^{MU}}{p_{Global}^{MU}}\right) \quad (15)$$

A.10 The MU-MIMO sub-band can be subdivided to the per-RAT MU-MIMO sub-bands, providing $N_{F,r}^{MU}$ frequencies to the rth RAT. The order of the frequency domain starting positions ($f_r^{first}$) of each per-RAT MU-MIMO sub-band ($A_r^{MU}$) within the SU-MIMO sub-band is left to implementation discretion.

A.11 The resource pool within the MU-MIMO sub-band for the rth RAT is $A_r^{MU} = \{(b,f) | \forall b; f_r^{first} \leq f \leq f_r^{last}\}$ wherein $f_r^{first} + N_{F,r}^{MU} = f_r^{last}$ and the procedure can be ended.

Multiple Regression or Support Vector Clustering Based Partitioning

The second partitioning policy can be called as the multiple regression or support vector clustering based partitioning policy, which performs the resource pool partitions by calculating the per-beam resource boundary and then performing multiple regression or support vector clustering where the independent variables are the horizontal and vertical beam angles of each beam and the dependent variable is the frequency-domain boundary of each beam. The procedure is as follows:

For each beam of each RAT, the per-beam total priority metric can be calculated:

$$p_{b,r}^{beamTotal} = \sum_{\substack{u=1 \\ b_u=b}}^{N_{U,r}} P_{u,r} l_{u,r}.$$

Each sample is added to the beam priority metric list $\{p_{b,r}^{beamTotal}\}$.

B.1 All entries in the beam priority metric list with zero priority metric for any RAT can be discarded: $p_{b,r}^{beam} = 0 \; \forall r$.

B.2 The beam priority metric list can then be reformatted into a three-dimensional list for each RAT $\{(h_b, v_b, p_{b,r}^{beam})\}_r$, where the first two dimensions of each element are the horizontal and vertical beam direction angles.

B.3 In this step a three-dimensional list can be created wherein the first two dimensions of each element are the horizontal and vertical beam direction angles, and where the third dimension is the corresponding target boundary in the frequency domain: $\{(h_b, v_b, f_{b,r}^{target})\}_r$.

In accordance with an embodiment, there are two options how to create the target boundary. The first option is based on load balanced target boundary as follows:

For each beam $b \in \{b_u\}$ $$f_{b,r}^{target} = \begin{cases} \text{round}\left(N_F^{MU} \frac{p_{b,r}^{beamTotal}}{\sum_{r=1}^{N_R} p_{b,r}^{beamTotal}}\right) + f_{b,r-1}^{target} & \text{for } r = 1, \ldots, N_R - 1 \\ N_F^{MU} & \text{for } r = N_R \end{cases} \quad (16)$$

where $f_0^{target} = 0$.

The second option is based on cherry-picking target boundary as follows:

Define per-beam priority metrics:

$$p_{b,r}^{beam} = \sum_{\substack{u=1 \\ b_u=b}}^{N_{U,r}} p_{u,r}$$

Define per-beam load:

$$l_{b,r}^{beam} = \sum_{\substack{u=1 \\ b_u=b}}^{N_{U,r}} l_{u,r}$$

According to an embodiment, an iterative algorithm can be performed for each beam $b \in \{b_u\} \forall r$ as follows, expressed using a pseudocode:

1. Initialize: $l_{b,r}^{remain} = l_{b,r}^{beam}$; $N_{F,b,r}^{MU} = 0$; $n = 0$; $f_0^{target} = 0$
2. While $n < N_F^{MU}$ a. $r^* = \underset{r: l_{b,r}^{remain} > 0}{\arg\max} \; p_{b,r}^{beam}$ b. $N_{F,b,r^*}^{MU} = N_{F,b,r^*}^{MU} + 1$
   c. $l_{b,r}^{remain} = l_{b,r}^{remain} - 1$ d. n = n + 1
3. If n < $N_F^{MU}$
   a. For r = 1, 2, ..., $N_R$ - 1 i. $N_{F,b,r}^{MU} = N_{F,b,r}^{MU} + \text{round}\left((N_F^{MU} - n)\frac{p_{b,r}^{beam}}{\sum_{r=1}^{N_R} p_{b,r}^{beam}}\right)$ ii. $n = n + \text{round}\left((N_F^{MU} - n)\frac{p_{b,r}^{beam}}{\sum_{r=1}^{N_R} p_{b,r}^{beam}}\right)$ b. $N_{F,b,N_R}^{MU} = N_{F,b,N_R}^{MU} + N_F^{MU} - n$
4. For r = 1, 2, ..., $N_R$
   a. $f_{b,r}^{target} = f_{b,r-1}^{target} + N_{F,b,r}^{MU}$ B.4 After creating the list, multiple polynomial regression can be performed on $\{(h_b, v_b, f_{b,r}^{target})\}_r$, wherein $f_r^{target}$ is the dependent variable to find the fitted frequency domain boundary ($f_{r,b}^{fit}$) for each beam. An alternative to polynomial regression is support vector clustering which yields the fitted boundaries ($\{f_{r,b}^{fit}\}$) given the samples $\{(h_b, v_b, f_{b,r-1}^{target})\}_r$ and $\{(h_b, v_b, f_{b,r}^{target})\}_r$. Parameters and procedures for polynomial regression and support vector clustering are left to implementation discretion.

B.5 The resource partition for the rth RAT within the MU-MIMO sub-band is $A_r^{MU}=\{(b,f)|(b,f_{r-1}^{fit}<f\leq f_{r,b}^{fit}) \forall b\in\{b_u\}\}$. The number of frequency resources for the beam is denoted as $N_{F,b,r}^{MU}$ and calculated as $N_{N,b,r}^{MU}= f_{r,b}^{fit}-f_{r-1,b}^{fit}$.

Combinatorial Search Based Partitioning

The third partitioning policy can be called as the combinatorial search based partitioning scheme, which obtains the resource pool partitioning by searching for the set of partitioning indicators ($\{\zeta_{r,b_u,f}\}$) which maximizes the optimality problem described in the equation (6). The optimum partitioning solution can be denoted as $\{\zeta_{r,b_u,f}\}^*$. Since the problem is non-linear and NP-hard and has a large search space, brute-force-search may be infeasible. The specific search algorithm used (e.g. greedy search, evolutionary algorithms, probabilistic algorithms, etc.) and heuristic simplifications applied are left to implementation discretion.

Given the set of partitioning indicators solved by combinatorial search, the resource partition for the rth RAT within the MU-MIMO sub-band is $A_r^{MU}=(b,f)|\{\zeta_{r,b_u,f}\}=1$.

The total number of frequency resources provided to a beam is $N_{F,b,r}=\sum_{f=1}^{N_F}\zeta_{r,b_u,f}$.

Neural Network Based Partitioning

The fourth partitioning policy can be called as the neural-network-based resource pool partitioning, which may be useful to ultra-efficiently approximate the behavior of high computational-requirement but excellent-performing partitioning schemes. According to an embodiment, it is enough to define the inputs and outputs to the neural network as follows:

Neural Network Inputs:
per-beam total priority metrics: $\{p_{b,r}^{beamTotal}\}$
per-beam per-resource priority metrics under varying interference values: $\{\{p_{b,r}^{beam}(\hat{\alpha})\}\}$
  $\hat{\alpha}=0, \delta, 2\delta, \ldots, (N_\alpha-1)\delta$ where $\delta>0$ is an arbitrary small value and $N_\alpha\in\mathbb{Z}_{++}$ where $p_{b,r}^{beam}(\hat{\alpha}) = \sum_{\substack{u=1 \\ b_u=b}}^{N_{U,r}} p_{u,r}(\alpha = \hat{\alpha})$ $\{\{p_{b,r}^{beam}(\hat{\alpha})\}\}=\{p_{b,r}^{beam}(\hat{\alpha}_0)\}\cup\{p_{b,r}^{beam}(\hat{\alpha}_1)\}\cup\ldots\cup\{p_{b,r}^{beam}(\hat{\alpha}_{N_\alpha})\}$ per-beam load: $\{l_{b,r}^{beam}\}$ where $l_{b,r}^{beam} = \sum_{\substack{u=1 \\ b_u=b}}^{N_{U,r}} l_{u,r}$ Neural Network Outputs:
OPTION 1: Three-dimensional binomial 'probability'
  Partitioning indicator map: $\{\zeta_{r,b_u,f}\}$
OPTION 2: Two-dimensional 'real-valued'
  The number of frequency resources for each beam: $N_{F,b,r}^{MU}$ If the partitioning indicator map is outputted, the resource partition for the rth RAT within the MU-MIMO sub-band is $A^{MU}=(b,f)|\zeta_{r,b_u,f}=1)$. Alternatively, if from an $N_{F,b,r}^{MU}$ output, the resource partition for the rth RAT within the MU-MIMO sub-band is $A_r^{MU}=\{(b,f_{r-1,b}^{fit}<f\leq f_{r-1,b}^{fit}+N_{F,b,r}^{MU})\forall b\in\{b_u\}\}$, where $f_{0,b}^{fit}=0$.

Neural Network Training Phase

Figure 8:
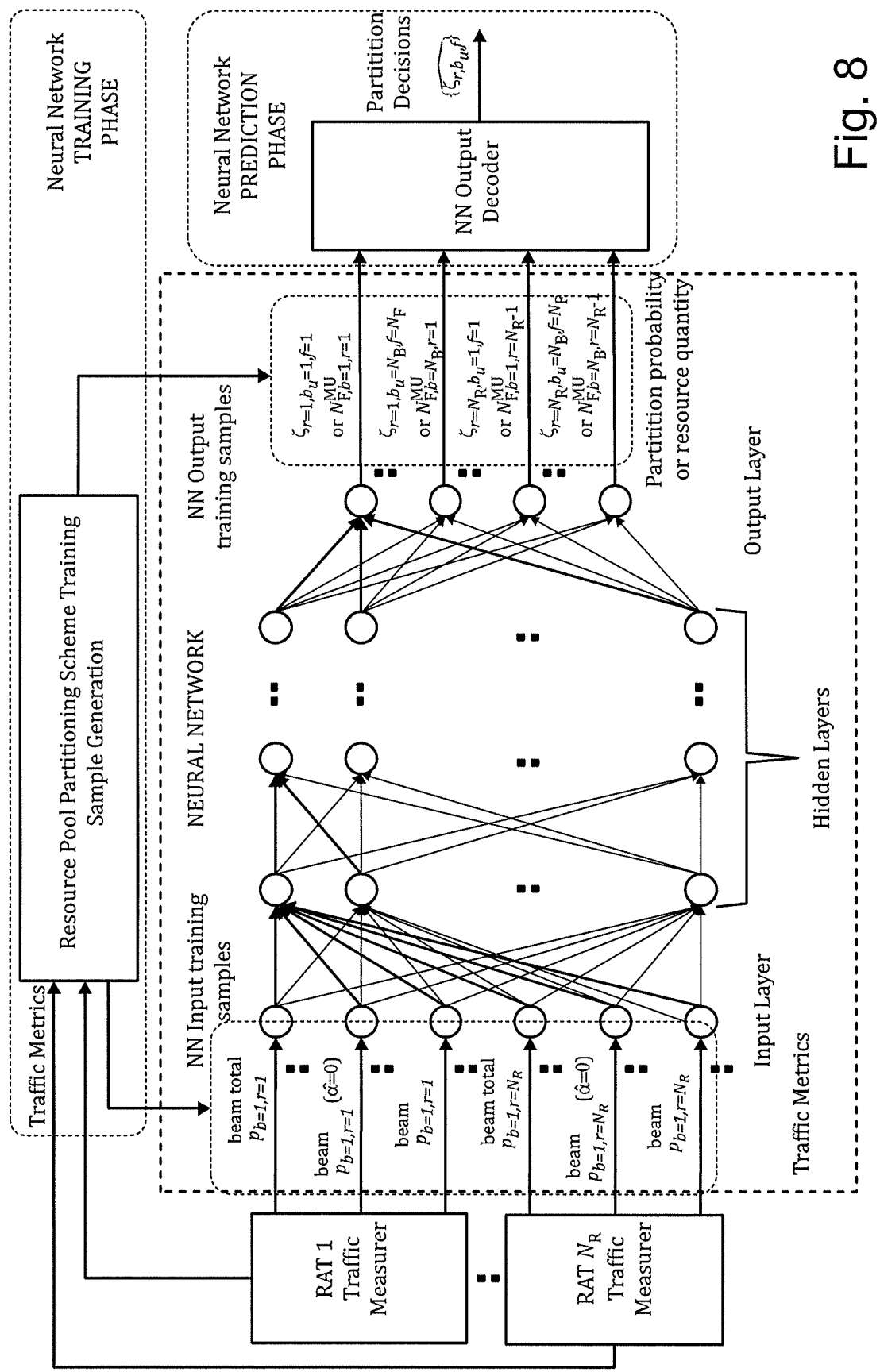
FIG. 8 shows an example of supervised learning, in accordance with an embodiment.

The neural network (NN) may be trained from samples generated using any of the four above-mentioned policies or any other partitioning policy. The neural network architecture (e.g. Fully-connected, Recurrent, Convolutional) and hyper-parameters are left to implementation discretion. The neural network training may be via supervised learning wherein the input-output samples are from a generated training set, as illustrated in FIG. 8. The example shown in FIG. 8 uses a fully-connected neural network architecture.

Details on the neural network training policies are left to implementation discretion.

Neural Network Prediction Phase

In its prediction phase, a neural network output decoder is used to generate the partition decisions, denoted as ($\{\widetilde{\zeta_{r,b_u,f}}\}$), from the raw neural network output. If the neural network outputs partition probabilities $\zeta_{r,b_u,f}$, the decoded partition decision for each resource is the corresponding RAT which resulted in a highest probability:

$$\widetilde{\zeta_{r,b_u,f}} = \arg\max_r \zeta_{r,b_u,f} \, \forall \, b_u, \forall \, f \quad (17)$$

On the other hand, if the neural network outputs are the number of resources allocated to a RAT $N_{F,b,r}^{MU}$, then the last RAT's number of resources is the left-over $N_{F,b,N_R}^{MU}=\max(N_{F,b}^{MU}-\sum_{i=0}^{r-1} N_{F,b,r}^{MU}, 0)$, and the partition decision is $$\widetilde{\zeta_{r,b_u,f}} = \begin{cases} 1 & \sum_{i=0}^{r-1} N_{F,b,r}^{MU} \leq f \leq \sum_{i=0}^{r} N_{F,b,r}^{MU} \\ 0 & \text{otherwise} \end{cases} \quad (18)$$

Reinforcement Learning Approach

Neural network-based resource pool split may also be via reinforcement learning wherein on-line decision making is performed and the training samples are generated via exploration or exploitation. A common reinforcement learning technique is to model the Q function of the Bellman equation using a deep neural network (DNN). Here, a deep-Q-network models the set of Q-values of the Bellman equation:

$$Q(s, a) = r(s, a) + \eta \max_{a'} Q(s'(s, a), a') \qquad (19)$$

where $\eta$ is the future discount factor ($0 \leq \eta \leq 1$), s is the state the system is at, and $\alpha$ is the action taken at state s. In this context, the state s represents a given traffic metric state together with the current partition $\{\zeta_{r,b_u,f}\}$ derived from the set $\{N_{F,b,r}^{MU}\}$. Meanwhile, each action a corresponds to the discrete-valued increase or decrease in the number of MU frequency resources allocated to a RAT for a beam: $\Delta N_{F,b,r}^{MU}$ for $\forall b$, r=1, . . . , $N_{R-1}$, For example, $\Delta N_{F,b,r}^{MU}$=0, ±1, ±2, . . . .

The Q value represents a future reward that is observed when taking action a and it is equal to the sum of the immediate reward r(s,a) and potential maximum future reward $$\max_{a'} Q(s'(s, a), a')$$

of the state s' to which the system will transition assuming action a is taken. The Q value is the output of the deep neural network. In this context, the Q-function's reward value r(s,a) is the net increase in the optimality function $\Phi$ ($\{\zeta_{r,b,f}\}$) of Eq. (6):

$$r(s,a) = \Phi(s'(s,a)) - \Phi(s), \qquad (20)$$

Assuming $\eta$=1, in this context, the Q value of action a represents the remaining maximum potential increase in optimality by adjusting $N_{F,b,r}^{MU}$ by $\Delta N_{F,b,r}^{MU} \forall b$, r= 1, . . . , $N_{R-1}$ and then using the equation (16) to arrive at the new partition set $\{\zeta_{r,b,f}\}$. To obtain the optimal Q-function, a value iteration (i.e. exploration/exploitation) for all states and actions may need to be conducted. The RL exploration/exploitation strategy (e.g. E-Greedy) during the deep Q neural network (DQN) training is left to implementation discretion.

Inter-Rat Interference Map Definition

The inter-RAT interference map is a three-dimensional map wherein each element is a predicted inter-RAT interference-to-signal ratio value ($\beta_{r,b,f}^{predicted}$) assigned to each beam-frequency resource that has been allocated to each RAT.

The following policies may be defined for predicting the inter-RAT interference from the resource pool partitioning $\{\zeta_{r,b,f}\}$: a total interference policy and a maximum interferer policy.

Total Interference Policy

Under the full (total) interference policy, the predicted inter-RAT interference to each allocated resource is the sum of interferences from all resources possibly used by all other RATs. It is assumed that all resources allocated to other RATs are used.

$$\beta_{r,b,f}^{predicted} = \beta_{r,b,f}^{predictedTotal} = \sum_{q=1}^{N_R} \sum_{k=1}^{N_B} \sum_{g=1}^{N_F^{Global}} \zeta_{r,b,f} I_{q,k,b,f}^{beam} I_{g,f,q,r}^{frequency} \qquad (21)$$

Maximum Interferer Policy

Under the maximum interferer policy, the predicted inter-RAT interference to each allocated resource is the maximum interferer from all resources possibly used by another RAT.

$$\beta_{r,b,f}^{predicted} = \beta_{r,b,f}^{predictedMax} = \sum_{q=1}^{N_R} \max_k \max_g \zeta_{r,b,f} I_{q,k,b,f}^{beam} I_{g,f,q,r}^{frequency} \qquad (22)$$

Inter-RAT-Interference-Adjusted Link Adaptation and Packet Scheduling

The rationale for obtaining the predicted interference map and resource pool is to adjust the link adaptation and packet scheduling to the inter-RAT interference under joint FDM-SDM coexistence.

The resource pool provides the list of non-restricted resources for user allocation. This limits the values of the scheduling indicator wherein $x_{r,b,f}$=0 if $\zeta_{r,b,f}$=0.

Meanwhile, the interference map is used to adjust the multi-user SINR within the allocated resource pool. The inter-RAT-interference adjusted multi-user SINK ($s_{r,b_u,f}^{MU,adjusted}$) is formulated as:

$$S_{r,b_u,f}^{MU,adjusted} = \frac{1}{\beta_{r,b_u,f}^{predicted} + y_{r,b_u,f} + 1/s_{r,b_u,f}^{SU}} \qquad (23)$$

where the intra-RAT cross-beam interference $\gamma_{r,b_u,f}$ depends on the set of scheduling selection indicators $\{x_{r,b,f}\}$ on the frequency resource f.

The adjusted multi-user SINR is used for modulation and coding scheme (MCS) determination and priority metric calculation. Under proportionally fair scheduling, the adjusted per-resource priority metric is:

$$p_{u,r,f}^{adjusted} = p_{u,r,f}^{PF,adjusted} = q_{u,r} \frac{T_{u,r}^{instantPerResource}\left(S_{r,b_u,f}^{MU,adjusted}\right)}{T_{u,r}^{aveAllResource}} \qquad (24)$$

The adjusted priority metrics are then used by the scheduler to assign users to the resources. The sum priority-metric maximising assignment is multi-user-MIMO cherry-picking, where the multi-user-MIMO pairing with the highest sum multi-user priority metric among all remaining frequencies and remaining users is selected iteratively. The specific frequency-domain resource-user pairing scheme which uses the adjusted priority metric is left to implementation discretion.

The above described methods enable joint space division multiplexing and frequency division multiplexing for inter-RAT dynamic spectrum sharing. By jointly exploiting both frequency domain and the spatial domain variability in traffic, it potentially may provide throughput and latency gains over FDM, TDM, and SDM and is applicable to NR-LTE in coexistence (i.e. assumptions are supported by 3GPP specifications).

One motivation for some embodiments is a potential for improved throughputs and latency without the requirement of a joint multi-RAT scheduler. System-level RAN simulations have shown that compared to prior art (i.e. TDM/FDM coexistence scheme), the embodiments (i.e. SDM+FDM) achieved some gain in cell-edge user throughput and also in average cell throughput.

An RF frontend comprises RF circuitry between a baseband processor and one or more antenna ports. The RF frontend comprises a transmission path/chain and a reception path/chain. Examples of circuitry of the RF frontend comprise one or more band-pass filters, power amplifiers, local oscillators, and mixers. The transmission path converts a baseband signal to RF signal for feeding the RF signal to antenna via an antenna port. The reception path converts an RF signal received by an antenna connected to an antenna port to a baseband signal that is fed to the baseband part. The conversion of the signal between the baseband processor and the antenna port may be via at least one intermediate frequency. The RF frequencies may be licensed or unlicensed frequencies. Examples in accordance with at least some embodiments may utilize at least RF frequencies below 6 GHz.

A baseband signal comprises an unmodulated signal or a modulated signal comprising one or more symbols according to a modulation method. The baseband signal may be an IQ signal comprising an in-phase and a quadrature phase. An example of the modulation method is a multi-carrier modulation method such as an orthogonal frequency-division multiplexing (OFDM) scheme. The OFDM symbols may form a transmission burst for a communications channel of a wireless communications system. Examples of the communications channels comprise at least shared and dedicated communications channels that may be uplink, UL, channels or downlink, DL, channels. An uplink channel refers to a channel for transmitting data from a wireless device to an access node and a downlink channel refers to a channel for transmitting data from an access node to a wireless device.

MIMO in wireless communications is a technique that enables the transmission and reception of multiple independent data streams. This helps to increase the maximum data rate at which communications can occur reliably. Some applications of MIMO are described in the following sections.

A MIMO transceiver, MIMO TRX, comprises at least an RF frontend and antenna ports for connecting to multiple antennas for transmission, TX, and reception, RX, of a MIMO transmission. The MIMO transceiver may be capable of single antenna transmissions, e.g. Single input Multiple output, single input single output. The RF frontend may be connected to a baseband processor. The RF frontend comprise a plurality of unique hardware (HW) paths through the RF front between the baseband processor and antenna ports. The HW paths comprise transmission paths and reception paths. Each of the HW paths introduce a delay that is characteristic for a specific transmission path. A base band signal for a MIMO transmission is processed by two or more transmission paths and fed to at least two antennas via antenna ports. Transmission times of the signal via each of the antennas should be time aligned for reducing a delay margin required of the MIMO transmission.

A baseband transceiver, TRX, may be a baseband processor that performs baseband processing of transmitted and received signals via an RF frontend. A typical interface between the baseband processor and the RF frontend comprises an analog-to-digital converter, ADC, and a digital-to-analog converter, DAC. The baseband processor processes baseband signals for transmission and reception by the RF frontend.

At least some of the embodiments may be applied in a wireless communication system or a wireless communication network that supports TSN. 5G standard is seen as one example that could fit to meet very stringent requirements in terms of both latency and reliability as well as highly precise synchronization accuracy of the applications running over TSN networks. Also other standards may be feasible.

In the following, different exemplifying embodiments will be described using, as an example of an access architecture to which the embodiments may be applied, a radio access architecture based on Long Term Evolution Advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet protocol multimedia subsystems (IMS) or any combination thereof.

Figure 1:
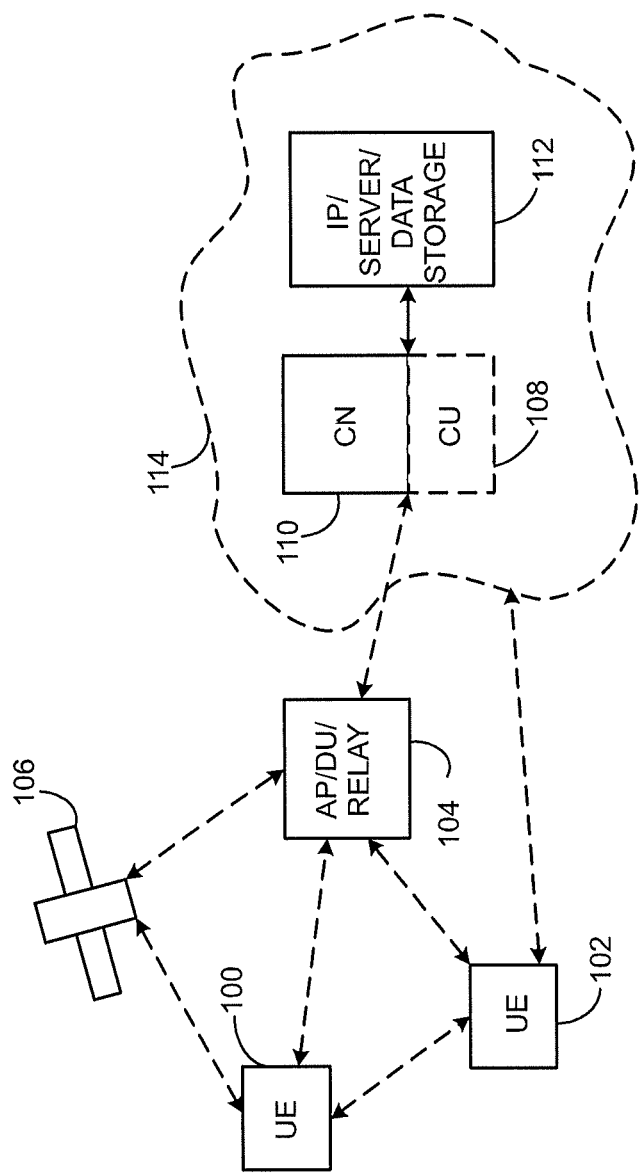
FIG. 1 shows a part of an exemplifying wireless communications access network in accordance with at least some embodiments of the present invention.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communication system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. The CN may comprise network entities or nodes that may be referred to management entities. Examples of the network entities comprise at least an Access management Function (AMF).

The user device (also called a user equipment (UE), a user terminal, a terminal device, a wireless device, a mobile station (MS) etc.) illustrates one type of an apparatus to which resources on the air interface are allocated and assigned, and thus any feature described herein with a user device may be implemented with a corresponding network apparatus, such as a relay node, an eNB, and an gNB. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR)

networks are being designed to support multiple hierarchies, where MEC servers can be placed between the core and the base station or nodeB (gNB). It should be appreciated that MEC can be applied in 4G networks as well. The gNB is a next generation Node B (or, new Node B) supporting the 5G network (i.e., the NR).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 3:
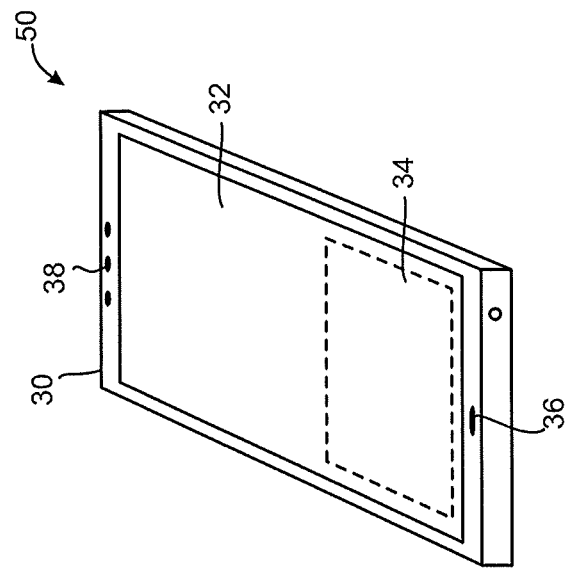
FIG. 3 shows an apparatus in accordance with at least some embodiments of the present invention.
Figure 2:
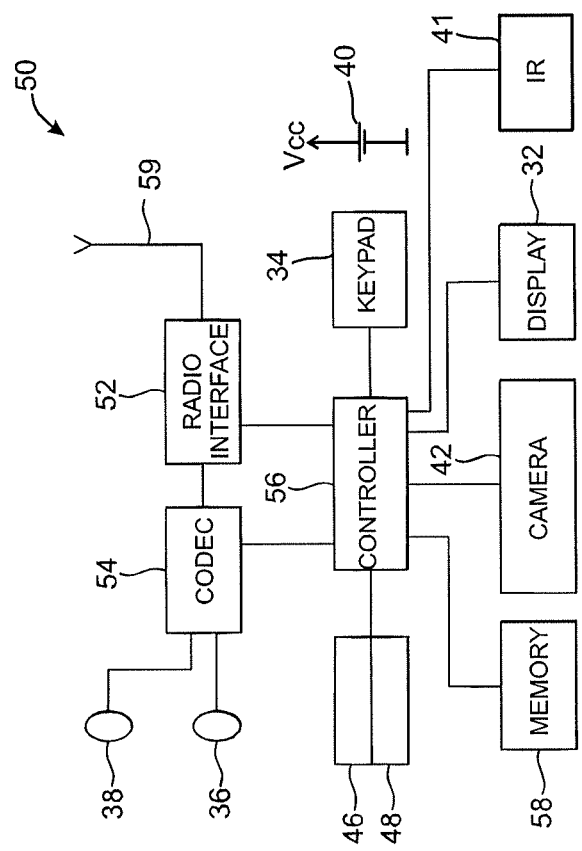
FIG. 2 shows a block diagram of an apparatus in accordance with at least some embodiments of the present invention.

The following describes in further detail suitable apparatus and possible mechanisms for implementing some embodiments. In this regard reference is first made to FIG. 2 which shows a schematic block diagram of an exemplary apparatus or electronic device 50 depicted in FIG. 3, which may incorporate a transmitter according to an embodiment of the invention.

The electronic device 50 may for example be a wireless device, mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short-range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and UICC for providing user information and being suitable for providing authentication information for authentication and authorization of the user at a network.

The apparatus 50 may comprise radio interface circuitry 52 (also can be called as radio frequency module) connected to the controller (or the processor) and suitable for generating wireless communication signals for example for communication with a cellular communications network, a wireless communications system or a wireless local area network. The radio interface circuitry 52 includes one or more transmitters and one or more receivers. In this case, the transmitter and the receiver can be configured to one entity such as a radio transceiver. The apparatus 50 may further comprise a plurality of antennas 59 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 4:
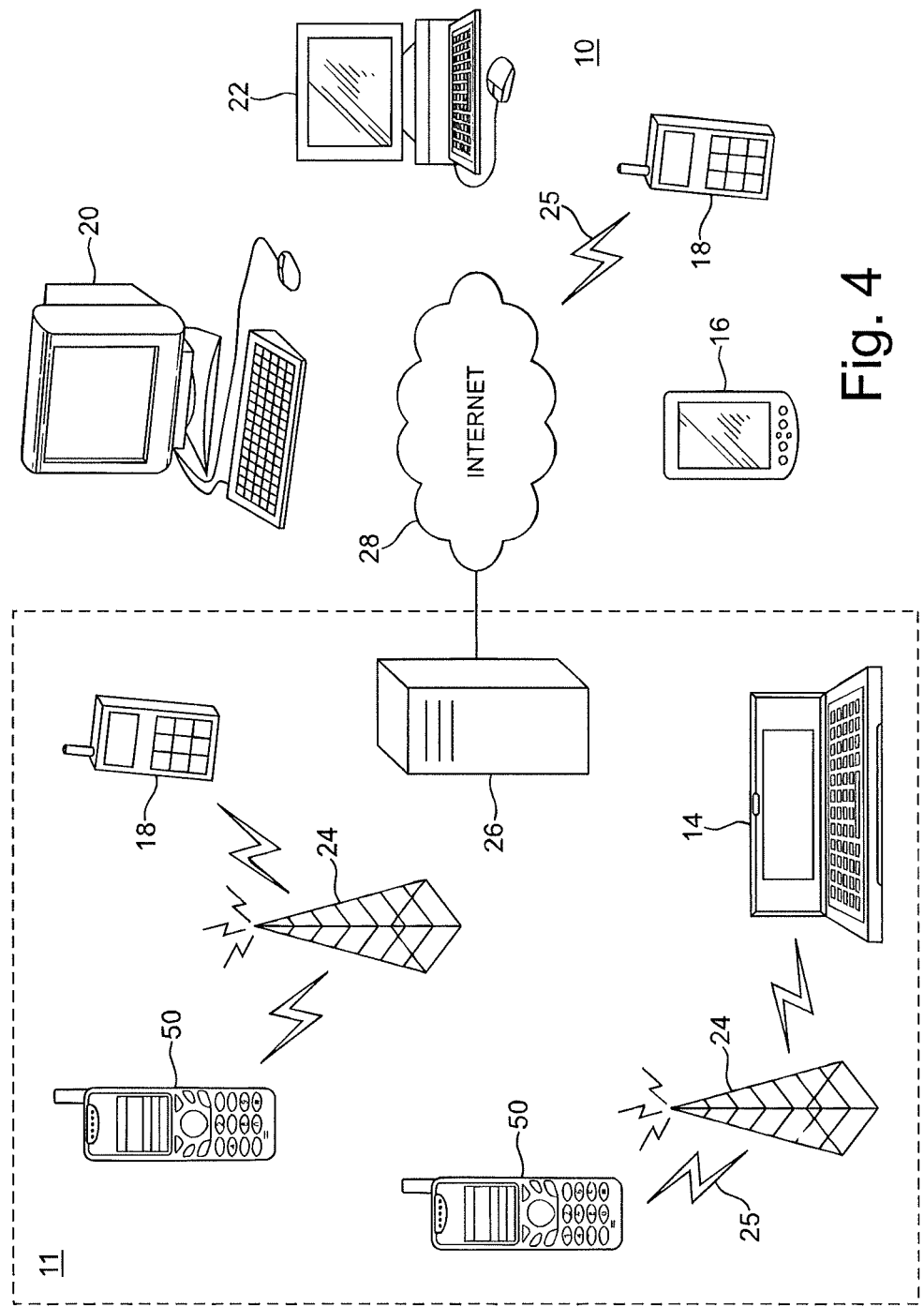
FIG. 4 shows an example of an arrangement for wireless communications comprising a plurality of apparatuses, networks and network elements.
Figure 5:
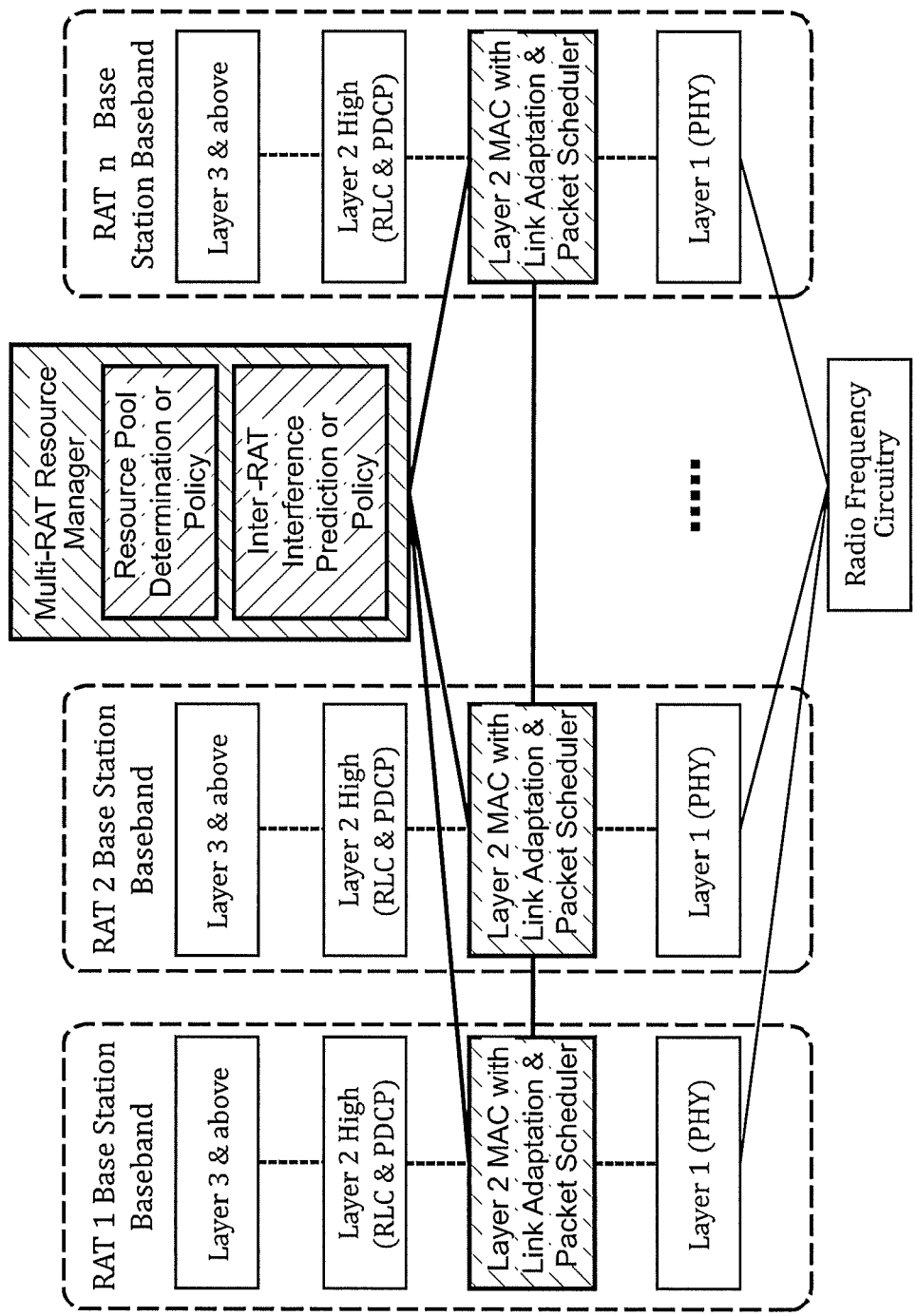
FIG. 5 shows an example of inter-radio-access-technology dynamic spectrum sharing, in accordance with an embodiment.

With respect to FIG. 4, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a GSM (2G, 3G, 4G, LTE, 5G), UMTS, CDMA network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 4 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. Yet some other possible transmission technologies to be mentioned here are high-speed downlink packet access (HSDPA), high-speed uplink packet access (HSUPA), LTE Advanced (LTE-A) carrier aggregation dual-carrier, and all multi-carrier technologies. A communications device involved in implementing various embodiments of the present invention may communicate using various media including, but not limited to, radio, infrared, laser, cable connections, and any suitable connection. In the following some example implementations of apparatuses utilizing the present invention will be described in more detail.

Figures 10A, 10B:
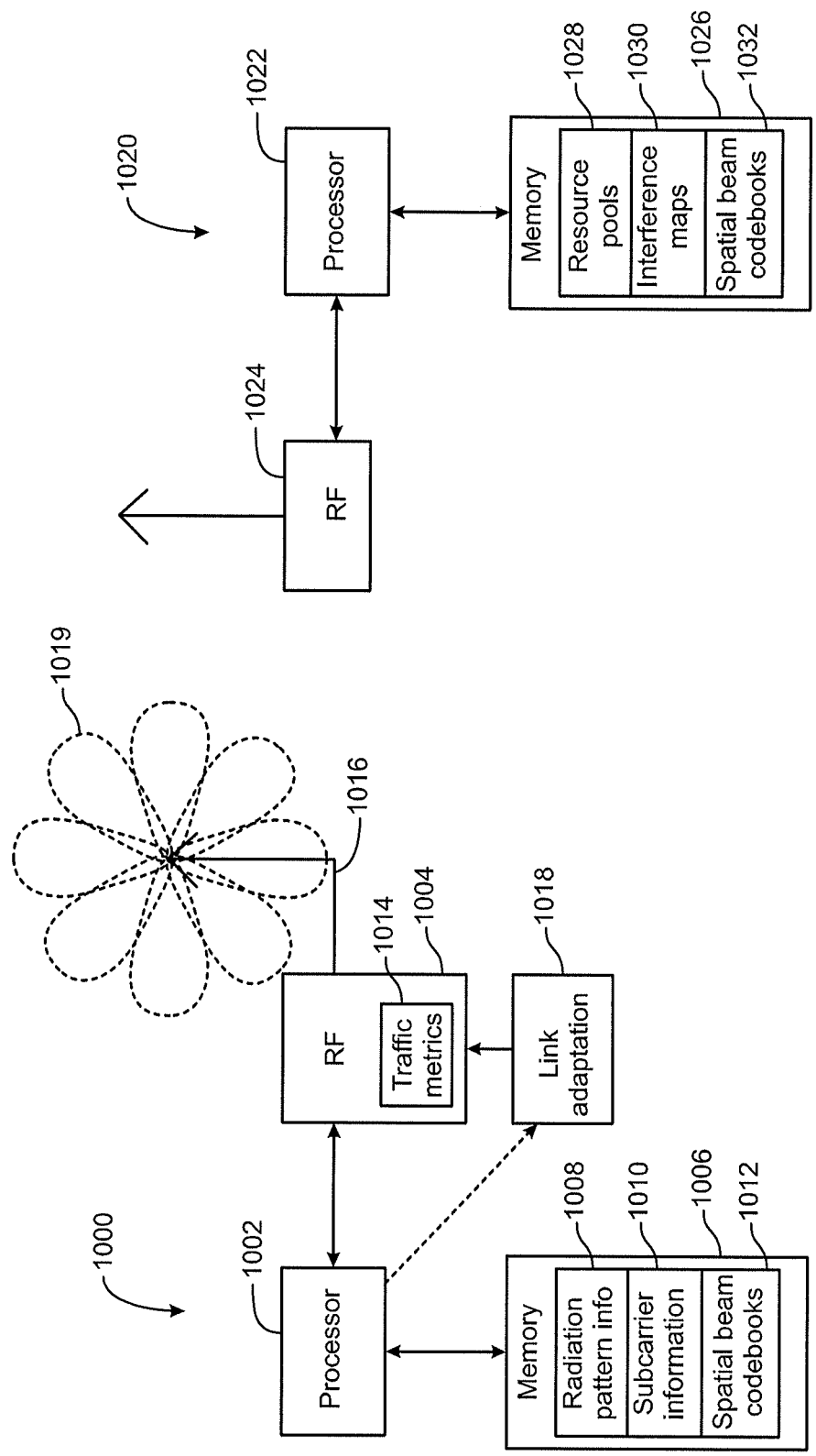
FIG. 10a illustrates an example of a block diagram of an apparatus in accordance with at least some embodiments of the present invention.
FIG. 10b illustrates an example of a block diagram of another apparatus in accordance with at least some embodiments of the present invention.

FIG. 10a illustrates an example of a block diagram of an apparatus in accordance with at least some embodiments of the present invention. The apparatus 1000 may be, for example, a part of a base station. The apparatus 1000 comprises a processor 1002 and a MIMO transceiver 1004. The processor is operatively connected to the transceiver for controlling the transceiver. The apparatus may comprise a memory 1006. The memory may be operatively connected to the processor. It should be appreciated that the memory may be a separate memory or included to the processor and/or the transceiver. The memory 1006 may be used to store information, for example, about radiation patterns 1008, subcarriers 1010 and spatial beam codebooks 1012 and/or for some other information. The apparatus 1000 may also comprise a traffic metrics block 1014 for measuring traffic (communication path) properties and a link adaptation block 1018.

FIG. 10a illustrates an example of a radiation pattern 1019 of a MIMO antenna in a simplified manner.

According to an embodiment, the processor is configured to control the transceiver and/or to perform one or more functionalities described with a method according to an embodiment.

According to an embodiment, there is provided an apparatus comprising means for measuring delays between a calibration signal fed to an antenna port via an RF frontend transmission path of a MIMO transceiver comprising a plurality of antenna ports 1016 connected to RF frontend transmission paths and the calibration signal received at one or more other antenna ports of the MIMO transceiver, wherein the calibration signal is fed to each of the antenna ports at a time for measuring at least one delay according to a measurement set; and means for determining, on the basis of the measured delays, one or more delay configurations for baseband signals fed to the RF frontend transmission paths for aligning timing of transmissions across the antenna ports.

FIG. 10b illustrates an example of a block diagram of an apparatus 1020 in accordance with at least some embodiments of the present invention. The apparatus 1020 may be, for example, a part of the resource manager. The apparatus 1020 comprises a processor 1022, a memory 1024 and a transceiver 1024. The processor is operatively connected to the transceiver for controlling the transceiver. The apparatus may comprise a memory 1026. The memory may be operatively connected to the processor. It should be appreciated that the memory may be a separate memory or included to the processor and/or the transceiver. The memory 1026 may be used to store information, for example, about resource pools 1028, interference maps 1030 and spatial beam codebooks 1032 and/or for some other information.

According to an embodiment, the processor is configured to control the transceiver and/or to perform one or more functionalities described with a method according to an embodiment.

A memory may be a computer readable medium that may be non-transitory. The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs) and processors based on multi-core processor architecture, as non-limiting examples.

Embodiments may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer readable program code means, computer program, computer instructions, computer code etc. should be understood to express software for a programmable processor firmware such as the programmable content of a hardware device as instructions for a processor or configured or configuration settings for a fixed function device, gate array, programmable logic device, etc.

Although the above examples describe embodiments of the invention operating within a wireless device or a gNB, it would be appreciated that the invention as described above may be implemented as a part of any apparatus comprising a circuitry in which radio frequency signals are transmitted and/or received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules, field-programmable gate arrays (FPGA), application specific integrated circuits (ASIC), microcontrollers, microprocessors, a combination of such modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:
(a) hardware-only circuit implementations (such as implementations in only analogue and/or digital circuitry) and
(b) combinations of hardware circuits and software, such as (as applicable):
   (i) a combination of analogue and/or digital hardware circuit(s) with software/firmware and
   (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

EXAMPLES

The following is a list of examples in accordance with at least some embodiments:

1. An apparatus comprising:
means for defining a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
means for assigning a spatial beam index from the spatial beam codebook for a candidate user equipment of the radio access technology;
means for assigning a set of subcarriers for candidate user equipment of the radio access technology for each spatial beam index; and means for using the assigned sets of subcarriers and spatial beam indices of the other radio-access-technology for one or more of resource pool partitioning, link-adaptation, and packet scheduling for the candidate user equipment.

2. The apparatus according to the example 1, comprising means for:
obtaining information of a reference signal from the candidate user equipment; and
using the obtained information to assign the spatial beam index for the candidate user equipment.

3. The apparatus according to the example 1 or 2 comprising:
determining interference between two or more radio access technologies of the utilized inter-radio-access technology on the basis of an expected or measured received power of the inter-radio-access technology transmission and an expected or measured received power of a desired signal to obtain an inter-radio-access technology interference map.

4. The apparatus according to the example 1, 2 or 3 comprising:
defining a beam-frequency resource pool, in which a beam-frequency resource is a resource for data transmission consisting of a set of subcarriers that are sent over multiple antennas of the antenna array via a spatial beam.

5. The apparatus according to the example 3 or 4 comprising:
selecting the beam-frequency resource pool and the interference map for a base station; and
using the beam-frequency resource pool and the interference map to perform link-adaptation and packet scheduling.

6. The apparatus according to the example 5 comprising one of:
using a centralized operation mode in which a resource manager selects the beam-frequency resource pool and the interference map for the base station on the basis of signal measurements;
using a distributed operation mode in which the base station:
  receives information from a resource manager for determination of the beam-frequency resource pool and the interference map; and
  selects an appropriate beam-frequency resource pool and interference map.

7. The apparatus according to any of the examples 1 to 6 comprising at least one of:
providing a same radio frequency channel for coexisting radio-access technologies for communication between the base station and the candidate user equipment;
using an active antenna as said antenna array;
utilizing demodulation reference signal-based transmission between the base station and the candidate user equipment.

8. A method comprising:
defining a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
assigning a spatial beam index from the spatial beam codebook for a candidate user equipment of the radio access technology;
assigning a set of subcarriers for the candidate user equipment of the radio access technology for each spatial beam index; and
using the assigned set of subcarriers and spatial beam indices of the other radio-access technology for one or more of resource pool partitioning, link-adaptation, and packet scheduling for the candidate user equipment.

9. The method according to the example 8 comprising:
obtaining information of a reference signal from the candidate user equipment; and
using the obtained information to assign the spatial beam index for the candidate user equipment.

10. The method according to the example 8 or 9 comprising:
determining interference between two or more radio access technologies of the utilized inter-radio-access technology on the basis of an expected or measured received power of the inter-radio-access technology transmission and an expected or measured received power of a desired signal to obtain an inter-radio-access technology interference map.

11. The method according to the example 8, 9 or 10 comprising:
defining a beam-frequency resource pool, in which a beam-frequency resource is a resource for data transmission consisting of a set of subcarriers that are sent over multiple antennas of the antenna array via a spatial beam.

12. The method according to the example 10 or 11 comprising:
selecting the beam-frequency resource pool and the interference map for a base station; and
using the beam-frequency resource pool and the interference map to perform link-adaptation and packet scheduling.

13. The method according to the example 12 comprising one of:
using a centralized operation mode in which a resource manager selects the beam-frequency resource pool and the interference map for the base station on the basis of signal measurements;
using a distributed operation mode in which the base station:
  receives information from a resource manager for determination of the beam-frequency resource pool and the interference map; and
  selects an appropriate beam-frequency resource pool and interference map.

14. The method according to any of the examples 8 to 13 comprising at least one of:
providing a same radio frequency channel for coexisting radio-access technologies for communication between the base station and the candidate user equipment;
using an active antenna as said antenna array;
utilizing demodulation reference signal-based transmission between the base station and the candidate user equipment.

15. An apparatus comprising at least one processor; and at least one memory including computer program code the at least one memory and the computer program code configured to, with the at least one processor, cause the apparatus to perform at least the following:
define a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
assign a spatial beam index from the spatial beam codebook for a candidate user equipment of the radio access technology;
assign a set of subcarriers for candidate user equipment of the radio access technology for each spatial beam index; and
use the assigned sets of subcarriers and spatial beam indices of the other radio-access-technology for one or more of resource pool partitioning, link-adaptation, and packet scheduling for the candidate user equipment.

16. An apparatus comprising:
means for obtaining information about at least one spatial beam assigned by a base station for a user equipment from a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
means for calculating traffic metrics regarding communication between the base station and the user equipment;

means for sending the calculated traffic metrics to a resource manager;

means for receiving from the resource manager a resource pool and an inter-RAT interference map;

means for using the resource pool and the inter-RAT interference map for adjusting link-adaptation and packet scheduling for the user equipment.

17. The apparatus according to the example 16, configured to adjust link-adaptation and packet scheduling by one or more of the following:

at intervals;

triggered by a predetermined event.

18. A method comprising:

obtaining information about at least one spatial beam assigned by a base station for a user equipment from a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

calculating traffic metrics regarding communication between the base station and the user equipment;

sending the calculated traffic metrics to a resource manager;

receiving from the resource manager a resource pool and an inter-RAT interference map;

using the resource pool and the inter-RAT interference map for adjusting link-adaptation and packet scheduling for the user equipment.

19. An apparatus comprising:

a first circuitry configured to define a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

a second circuitry configured to assign a spatial beam index from the spatial beam codebook for a candidate user equipment of the radio access technology;

a third circuitry configured to assign a set of subcarriers for candidate user equipment of the radio access technology for each spatial beam index; and a fourth circuitry configured to use the assigned sets of subcarriers and spatial beam indices of the other radio-access-technology for resource pool partitioning, link-adaptation, and packet scheduling for the candidate user equipment.

20. A resource manager comprising:

means for defining a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

means for assigning a spatial beam index from the spatial beam codebook for a candidate user equipment of the radio access technology;

means for assigning a set of subcarriers for candidate user equipment of the radio access technology for each spatial beam index; and means for using the assigned sets of subcarriers and spatial beam indices of the other radio-access-technology for one or more of resource pool partitioning, link-adaptation, and packet scheduling for the candidate user equipment.

21. A base station comprising:

means for obtaining information about at least one spatial beam assigned by the base station for a user equipment from a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

means for calculating traffic metrics regarding communication between the base station and the user equipment;

means for sending the calculated traffic metrics to a resource manager;

means for receiving from the resource manager a resource pool and an inter-RAT interference map;

means for using the resource pool and the inter-RAT interference map for adjusting link-adaptation and packet scheduling for the user equipment.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. An apparatus comprising:

circuitry configured to define a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;

circuitry configured to assign a spatial beam index from the spatial beam codebook for a candidate user equipment of the radio access technology;

characterized in that the apparatus further comprises:
circuitry configured to assign a set of subcarriers for candidate user equipment of the radio access technology for each spatial beam index; and
circuitry configured to use the assigned sets of subcarriers and spatial beam indices of the other radio-access-technology for one or more of resource pool partitioning, link-adaptation, and packet scheduling for the candidate user equipment.

2. The apparatus according to claim 1, comprising circuitry configured to:

obtain information of a reference signal from the candidate user equipment; and use the obtained information to assign the spatial beam index for the candidate user equipment.

3. The apparatus according to claim 1 comprising circuitry configured to:

determine interference between two or more radio access technologies of the utilized inter-radio-access technology on the basis of an expected or measured received power of the inter-radio-access technology transmission and an expected or measured received power of a desired signal to obtain an inter-radio-access technology interference map.

4. The apparatus according to claim 1, comprising circuitry configured to:
define a beam-frequency resource pool, in which a beam-frequency resource is a resource for data transmission consisting of a set of subcarriers that are sent over multiple antennas of the antenna array via a spatial beam.

5. The apparatus according to claim 3 comprising circuitry configured to:
select the beam-frequency resource pool and the interference map for a base station; and
use the beam-frequency resource pool and the interference map to perform link-adaptation and packet scheduling.

6. The apparatus according to claim 5 comprising one of circuitry configured to:
use a centralized operation mode in which a resource manager selects the beam-frequency resource pool and the interference map for the base station on the basis of signal measurements; or
use a distributed operation mode in which the base station:
receives information from a resource manager for determination of the beam-frequency resource pool and the interference map; and
selects an appropriate beam-frequency resource pool and interference map.

7. The apparatus according to claim 1 comprising circuitry configured to provide at least one of:
providing a same radio frequency channel for coexisting radio-access technologies for communication between the base station and the candidate user equipment;
using an active antenna as said antenna array; or
utilizing demodulation reference signal-based transmission between the base station and the candidate user equipment.

8. A method comprising:
defining a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
assigning a spatial beam index from the spatial beam codebook for a candidate user equipment of the radio access technology;
characterized in that the method further comprises:
assigning a set of subcarriers for the candidate user equipment of the radio access technology for each spatial beam index; and
using the assigned set of subcarriers and spatial beam indices of the other radio-access technology for one or more of resource pool partitioning, link-adaptation, and packet scheduling for the candidate user equipment.

9. The method according to claim 8 comprising:
obtaining information of a reference signal from the candidate user equipment; and
using the obtained information to assign the spatial beam index for the candidate user equipment.

10. The method according to claim 8 comprising:
determining interference between two or more radio access technologies of the utilized inter-radio-access technology on the basis of an expected or measured received power of the inter-radio-access technology transmission and an expected or measured received power of a desired signal to obtain an inter-radio-access technology interference map.

11. The method according to claim 8, comprising:
defining a beam-frequency resource pool, in which a beam-frequency resource is a resource for data transmission consisting of a set of subcarriers that are sent over multiple antennas of the antenna array via a spatial beam.

12. The method according to claim 10 comprising:
selecting the beam-frequency resource pool and the interference map for a base station; and
using the beam-frequency resource pool and the interference map to perform link-adaptation and packet scheduling.

13. The method according to claim 12 comprising one of:
using a centralized operation mode in which a resource manager selects the beam-frequency resource pool and the interference map for the base station on the basis of signal measurements;
using a distributed operation mode in which the base station:
receives information from a resource manager for determination of the beam-frequency resource pool and the interference map; and
selects an appropriate beam-frequency resource pool and interference map.

14. The method according to claim 8 comprising at least one of:
providing a same radio frequency channel for coexisting radio-access technologies for communication between the base station and the candidate user equipment;
using an active antenna as said antenna array;
utilizing demodulation reference signal-based transmission between the base station and the candidate user equipment.

15. An apparatus comprising at least one processor; and at least one non-transitory memory including computer program code, the at least one memory and the computer program code configured to, with the at least one processor, cause the apparatus to perform at least the following:
define a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
assign a spatial beam index from the spatial beam codebook for a candidate user equipment of the radio access technology;
characterized in that the at least one memory includes computer program code the at least one memory and the computer program code configured to, with the at least one processor, cause the apparatus to further perform:
assign a set of subcarriers for candidate user equipment of the radio access technology for each spatial beam index; and
use the assigned sets of subcarriers and spatial beam indices of the other radio-access-technology for one or more of resource pool partitioning, link-adaptation, and packet scheduling for the candidate user equipment.

16. An apparatus comprising:
circuitry configured to obtain information about at least one spatial beam assigned with a base station for a user equipment from a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
circuitry configured to calculate traffic metrics regarding communication between the base station and the user equipment;
circuitry configured to send the calculated traffic metrics to a resource manager;
characterized in that the apparatus further comprises:
circuitry configured to receive from the resource manager a resource pool and an inter-RAT interference map;
circuitry configured to use the resource pool and the inter-RAT interference map for adjusting link-adaptation and packet scheduling for the user equipment.

17. The apparatus according to claim 16, configured to adjust link-adaptation and packet scheduling with one or more of the following:
at intervals; or
triggered with a predetermined event.

18. A method comprising:
obtaining information about at least one spatial beam assigned with a base station for a user equipment from a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
calculating traffic metrics regarding communication between the base station and the user equipment;
sending the calculated traffic metrics to a resource manager;
receiving from the resource manager a resource pool and an inter-RAT interference map;
using the resource pool and the inter-RAT interference map for adjusting link-adaptation and packet scheduling for the user equipment.

19. A computer program, stored on a non-transitory computer readable medium, comprising computer readable program code adapted to perform at least the following:
defining a spatial beam codebook of size $N_B$ on the basis of radiation patterns of an antenna array of a base station of a radio access network, which utilizes inter-radio-access technology, wherein each beam corresponds to a radiation pattern whose main lobe is uniquely directed to an angular direction with respect to the antenna array;
assigning a spatial beam index from the spatial beam codebook fora candidate user equipment of the radio access technology;
characterized in that the computer program comprising computer readable program code means adapted to further perform:
assigning a set of subcarriers for the candidate user equipment of the radio access technology for each spatial beam index; and
using the assigned set of subcarriers and spatial beam indices of the other radio-access technology for one or more of resource pool partitioning, link-adaptation, and packet scheduling for the candidate user equipment.

* * * * *